(12) United States Patent
La Roche et al.

(10) Patent No.: US 12,732,855 B2
(45) Date of Patent: Sep. 8, 2026

(54) SPECTRUM-EFFICIENT LOAD DISTRIBUTION FOR SPLIT BEARERS IN 5G DUAL CONNECTIVITY

(71) Applicant: Cisco Technology, Inc., San Jose, CA (US)

(72) Inventors: Humberto Jose La Roche, Ocean, NJ (US); Darin Andrew Kaufman, Lenexa, KS (US)

(73) Assignee: Cisco Technology, Inc., San Jose, CA (US)

( * ) Notice: Subject to any disclaimer, the term of this patent is extended or adjusted under 35 U.S.C. 154(b) by 382 days.

(21) Appl. No.: 18/440,092

(22) Filed: Feb. 13, 2024

(65) Prior Publication Data

US 2025/0261032 A1 Aug. 14, 2025

(51) Int. Cl.
*H04W 28/02* (2009.01)
*H04W 72/56* (2023.01)
*H04W 76/15* (2018.01)

(52) U.S. Cl.
CPC ... *H04W 28/0236* (2013.01); *H04W 28/0252* (2013.01); *H04W 72/56* (2023.01); *H04W 76/15* (2018.02)

(58) Field of Classification Search
CPC . H04W 28/0236; H04W 76/15; H04W 72/56; H04W 28/0252
See application file for complete search history.

(56) References Cited

U.S. PATENT DOCUMENTS

| | | | | |
|---|---|---|---|---|
| 2019/0068312 | A1* | 2/2019 | Zhang | H04L 1/0033 |
| 2019/0069325 | A1 | 2/2019 | Yerramalli et al. | |
| 2021/0092767 | A1* | 3/2021 | Jones | H04W 16/14 |
| 2021/0105846 | A1* | 4/2021 | Pawar | H04W 76/16 |
| 2022/0103332 | A1* | 3/2022 | Jung | H04L 5/0092 |
| 2022/0264679 | A1 | 8/2022 | Tamura et al. | |
| 2022/0353691 | A1* | 11/2022 | Vivanco | H04W 76/15 |
| 2022/0360404 | A1* | 11/2022 | Chen | H04L 1/1671 |
| 2023/0006762 | A1* | 1/2023 | Levitsky | H04L 1/0025 |
| 2023/0180322 | A1 | 6/2023 | Sevindik et al. | |
| 2024/0031100 | A1* | 1/2024 | Hao | H04L 5/0053 |

* cited by examiner

*Primary Examiner* — Mewale A Ambaye
(74) *Attorney, Agent, or Firm* — Polsinelli P.C.

(57) ABSTRACT

A method is described that involves a method for dual connectivity at a network device in a wireless communication system. The method includes determining at a UE a preferred allocation of multiband resources to be allocated by a gNB, sending, by the UE, a request to the gNB that includes data effective to cause the gNB to respond by allocating the preferred allocation of multiband resources, and receiving a first allocation of the multiband resources from the gNB, where the gNB provides the first allocation of the multiband resources based on the data effective to cause the gNB to allocate the preferred allocation of multiband resources.

20 Claims, 11 Drawing Sheets

SPECTRUM-EFFICIENT LOAD DISTRIBUTION FOR SPLIT BEARERS IN 5G DUAL CONNECTIVITY

FIELD OF THE TECHNOLOGY

The present technology relates to the field of network communication and routing technologies addressing configurations for spectrum-efficient load distribution. Specifically, the proposed technology relates to methods for dual connectivity at a user equipment (UE) in a wireless communication system.

BACKGROUND

Dual connectivity (DC) in the architecture of 5G networks plays a pivotal role in enhancing data rates, reliability, and resource utilization. Dual connectivity allows a user to simultaneously connect to two different cells, which can be located in different or the same location. This results in the aggregation of data from multiple sources, leading to higher data rates and increased throughput for the UE. Moreover, dual connectivity enhances the network's reliability by maintaining connections with multiple cell groups. If one connection experiences interference or degradation, the UE can still transmit and receive data through the other connection, ensuring a more reliable communication experience. In addition, dual connectivity allows for efficient use of available network resources by aggregating data streams at various protocol layers, such as the Packet Data Convergence Protocol (PDCP), which optimizes resource utilization and improves network efficiency. Dual connectivity also facilitates seamless handovers between different cells. If a UE moves between coverage areas served by different base stations, the UE can maintain continuous connectivity by utilizing both connections simultaneously. Furthermore, dual connectivity contributes to overall network capacity expansion by enabling a UE to connect to multiple cells. This is particularly important in dense urban areas or locations with high user density, where efficient use of available spectrum is crucial. Dual connectivity further supports advanced features such as E-UTRAN (EN) DC (EN-DC) or new radio (NR) DC (NR-DC).

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings, and the claims.

DETAILED DESCRIPTION

Figure 1:
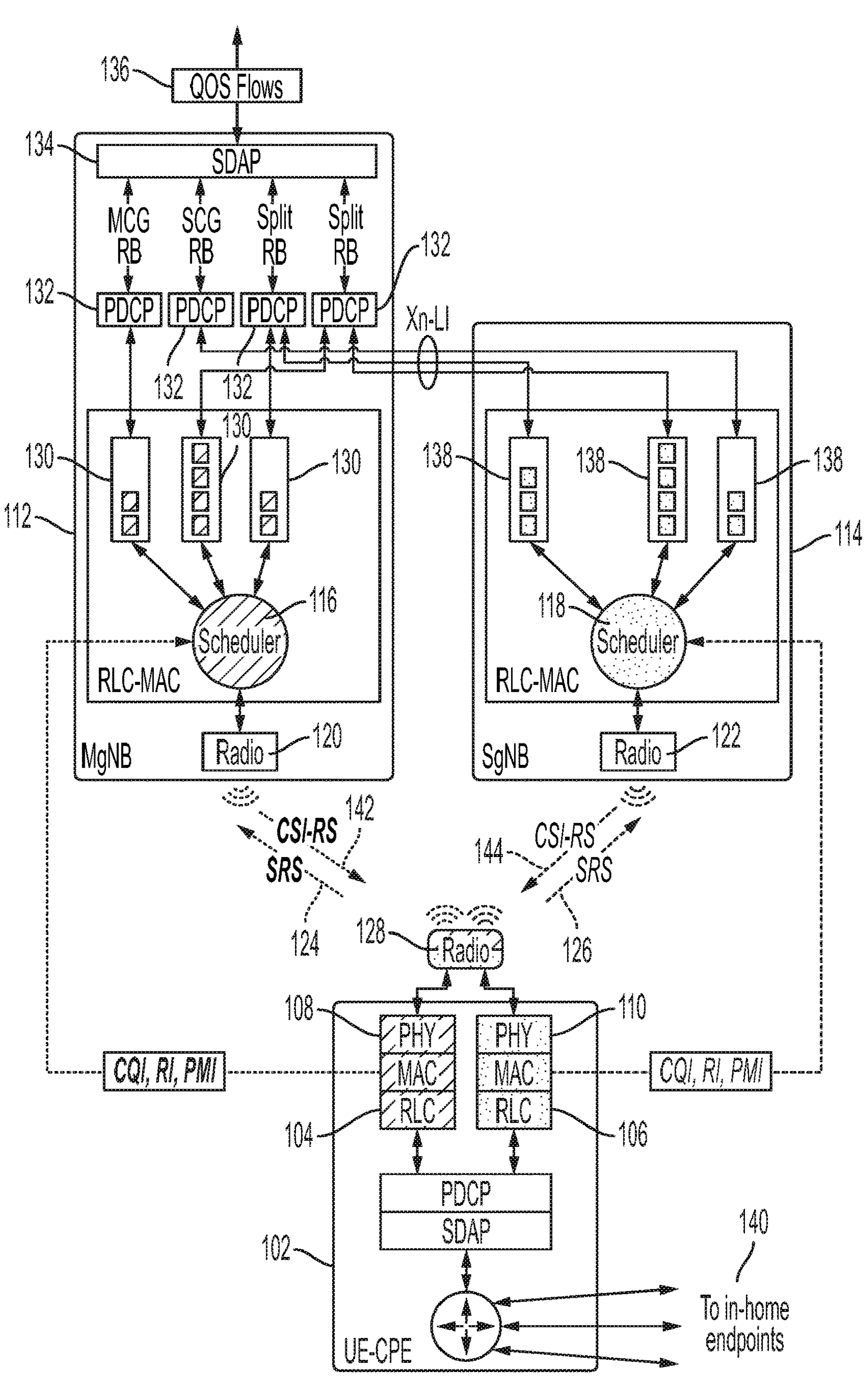
FIG. 1 illustrates an example scheduling control loop for new radio (NR) dual connectivity in accordance with some examples of the disclosure.

Various examples of the disclosure are discussed in detail below. While specific implementations are discussed, it should be understood that this is done for illustration purposes. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an example in the present disclosure can be references to the same example or any example; and such references mean at least one of the examples.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

The present disclosure is directed toward spectrum-efficient load distribution in multiple frequency bands for wireless communication, encompassing the fifth generation of mobile communications (5G) and long-term evolution (LTE).

In an example, a method for dual connectivity at a network device in a wireless communication system is disclosed. The method can include determining at a UE a preferred allocation of multiband resources to be allocated by a gNB, sending, by the UE, a request to the gNB that includes data effective to cause the gNB to respond by allocating the preferred allocation of multiband resources, and receiving a first allocation of the multiband resources from the gNB, where the gNB provides the first allocation of the multiband resources based on the data effective to cause the gNB to allocate the preferred allocation of multiband resources.

In some aspects, the method may also include where the preferred allocation is based on a determined distance from the gNB, the distance from the gNB is determined from a signal to interface plus noise ratio (SINR), where a greater proportion of noise in the SINR corresponds with a greater distance from the gNB.

The method may also include where the request to the gNB that includes the data effective to cause the gNB to respond by allocating the preferred allocation of multiband resources is a scheduling request specifying an amount of low frequency band resources and high frequency band resources for the UE.

The method may also include further includes processing at the gNB the resource request, the processing including determining based on the resource request one or more spectral resources to allocate to the UE to facilitate transmission of the data, identifying by a scheduler of the gNB a first-time period to transmit a first portion of the one or more spectral resources to the UE, and a second time period to transmit the second portion of the one or more spectral resources, where the scheduling of the first portion of the one or more spectral resources is based on a priority assigned to one or more data packets by the UE, and transmitting to the UE a response to the request includes an initial uplink grant including the allocation of the one or more spectral resources at the first and second time period.

The method may also include further includes determining a data rate of a plurality of data for transmission between the UE and the gNB; in response to the data rate not meeting a predetermined threshold generating a first recommendation to transmit to the gNB, advising an update to the low frequency band and high-frequency band resources allocated for data packet transmission to the UE, and generating a second recommendation to transmit to the UE, directing the allocation of one or more priorities for the transmission of a first set of data packets in the plurality of data.

The method may also include further includes a controller in communication with the gNB and the UE, where the controller is configured to analyze the allocation from the gNB to identify when the allocation of the low frequency band resources, and the high frequency band resources reach a predetermined ratio, and in response to the low frequency band resources and the high frequency band resources not meeting the predetermined ratio, prompt the gNB to generate a second set of low frequency band and high frequency band resources for transmission to the UE.

The method may also include further includes adjusting, at the gNB, the allocation specifying a set of low frequency band resources and high frequency band resources based on real-time network conditions, where the adjustment is determined by the gNB.

The method may also include further includes a deep reinforcement engine configured to monitor one or more parameters associated with the resource request from the UE, monitoring one or more parameters associated with the allocation of a set of low frequency band resources and high frequency band resources in response to the resource request, and based on the monitored parameters, generate one or more updates to the allocation of low frequency and high frequency band resources.

The method may also include further includes establishing two independent control loops for uplink transmission and downlink transmission, where the UE includes a controller configured to determine an optimized frequency band allocation for transmitting a plurality of data based on a distance to the gNB, send a resource request to the gNB, the resource request includes the specified amount of low frequency band resources and high frequency band resources for one or more connected devices, receive an allocation from the gNB in response to the resource request, the allocation specifying a set of allocated low frequency band resources and allocated high frequency band resources, evaluate the received allocation to identify one or more compatible resources applicable to the resource request, and transmit a second resource request based on the evaluation, the second resource request including an identification of one or more additional uplink or downlink spectral resources for data transmission.

In one aspect, a user equipment (UE) includes a transceiver. The UE also includes a processor configured to execute instructions and cause the processor to determine at a UE a preferred allocation of multiband resources to be allocated by a gNB, send, by the UE, a request to the gNB that includes data effective to cause the gNB to respond by allocating the preferred allocation of multiband resources, and receive a first allocation of the multiband resources from the gNB, where the gNB provides the first allocation of the multiband resources based on the data effective to cause the gNB to allocate the preferred allocation of multiband resources.

In one aspect, a non-transitory computer readable medium includes instructions, the instructions, when executed by a computing system, cause the computing system to detect a presence of a plurality of data for transmission from a user equipment (UE) to a next generation node B (gNB), determine at the network device a distance to a gNB, based on the determined distance, identify an amount of low frequency band resources and high frequency band resources for an optimized frequency band allocation, send a resource request to the gNB, the resource request including information specifying the identified amount of low frequency band resources and high frequency band resources for one or more connected devices, receive an allocation from the gNB in response to the resource request, the allocation specifying allocated low frequency band resources and allocated high frequency band resources, and modify one or more configurations at the network device to configure the one or more connected devices to utilize the allocated low frequency band resources and the allocated high frequency band resources for data transmission.

The following description is directed to certain implementations for the purposes of describing innovative aspects of this disclosure. However, a person having ordinary skill in the art will readily recognize that the teachings herein can be applied in a multitude of different ways and more specifically as it relates to dual connectivity in wireless systems. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

DESCRIPTION OF EXAMPLE EMBODIMENTS

Dual connectivity is achievable through either the Evolved Universal Terrestrial Radio Access Network (E-UTRAN) E-UTRAN-New Radio Dual Connectivity (ENDC) or New Radio Dual Connectivity (NRDC), where this technology facilitates channel bonding at the packet data convergence protocol (PDCP) layer utilizing a "split bearer." This mechanism merges traffic from two functional cell groups: the Master Cell Group (MCG) and the Secondary Cell Group (SCG). The radio access network (RAN) schedulers in both the MCG and SCG control uplink (UL) and downlink (DL) resources from these cell groups. For optimal resource management, MCG and SCG schedulers independently handle best-effort traffic, each assigned the task of maintaining a minimum target Block Error Rate. Operators strive to provide subscribers with a consistent DL/UL ratio.

However, the conventional split bearer implementation falls short of achieving spectral efficiency. The conventional split bearer maximizes resource usage locally for each user, leading to inefficient allocation of high-band and low-band resources concerning the DL/UL service definition. In specific scenarios, such as Fixed Wireless Access (FWA) use cases in data centers (DC), distributing downloads and uploads becomes challenging. The conventional approach may saturate the spectrum with low-revenue FWA bits, impacting more profitable mobility services on a per megahertz (MHz) basis. To address this, operators need to ensure that FWA customers are as spectrally efficient as possible, thereby reserving spectrum for other users and maintaining quality services for mobile users.

This technology can be advantageous to operators who create service plans based on the maximum achievable speeds assessed by a speed tester. However, the traditional approach of allocating the maximum available resources at a UE having customer premises equipment (UE-CPE) location is inefficient for both download and upload speeds. This means that resources are wasted on subscribers by delivering speeds beyond the contracted rate. Instead, the proposed technology allocates resources per the DL/UL service plan, which promotes more efficient resource utilization across the two spectrum bands.

The proposed technology improves the overall efficiency of Fixed Wireless Access (FWA) services by delivering optimal service with the least spectrum usage while also increasing capacity and coverage in FWA-only deployments. The technology also utilizes UE-CPE in dual connectivity to distribute the load from different cell groups on different frequencies so that the traffic mix from the different cells is optimal for the available spectrum and capacity of each frequency band for the service. These changes in the UE-CPE are often compatible with current modem implementations and standards but do not require any changes in the 5G RAN.

In an example where a user equipment (UE) serves a multitude of connected devices, the allocation of multiband resources by a gNB (next-generation base station) becomes a critical aspect. As the UE manages these connected devices, it often encounters the challenge of determining a preferred allocation of multiband resources, particularly in a fixed wireless service environment utilizing spectrum bands.

The issue arises due to the inherent nature of spectrum bands, which operate to allocate the maximum possible resources. Consequently, connected devices closer to the UE tend to receive the majority of these resources, leaving those positioned at greater distances with what remains-often in the form of mmWave resources. While mmWave is sufficient for devices in proximity to the base station, it becomes inadequate for those situated further away. As a result, the connected devices at a distance from the UE are left with unreliable Signal-to-Interference-plus-Noise Ratio (SINR) and frequently experience connectivity issues. In response to this challenge, the proposed technology aims to influence the gNB through a request that includes data capable of prompting the base station to allocate the preferred multiband resources.

This technology allows the UE to communicate its resource allocation preferences to the gNB, prompting the base station to respond with one or more allocations of multiband resources. The gNB, in turn, provides the initial allocation based on the effective data, ensuring that the preferred multiband resources are assigned. This approach mitigates the disparity in resource distribution among connected devices, particularly addressing the connectivity challenges faced by those situated farther away from the base station. By actively influencing the resource allocation process, the proposed technology enhances the overall reliability and performance of the connected devices within the wireless network.

FIG. 1 illustrates an example scheduling control loop for NRDC in accordance with some examples of the disclosure. In a setup where NRDC is enabled, a UE-CPE 102 can communicate simultaneously with both the Master gNB (MgNB) 112 and the Secondary gNB (SgNB) 114. This setup aims to enhance data transmission capabilities for multiple bandwidths.

The UE-CPE 102, as shown in FIG. 1, is configured to efficiently manage and coordinate data transmission and reception between the SgNB unit 106 and MgNB unit 104. As such, the UE-CPE 102 serves as the central point of control for the dual connectivity operation. The UE-CPE 102 is equipped with the intelligence to handle protocols, procedures, and resource allocations specific to both the Secondary Cell Group (SCG) associated with the SgNB 114 and the Master Cell Group (MCG) associated with the MgNB 112.

During communication with the SgNB 114, the UE-CPE 102 exchanges signaling messages, including measurements, handover commands, and scheduling requests. The UE-CPE 102 actively participates in the scheduling process, providing feedback to the SgNB 114 about the quality of the connection and signaling its readiness to receive or transmit data. Simultaneously, the UE-CPE 102 engages with the MgNB 112, maintaining similar responsibilities for the MCG.

The UE-CPE further includes service data adaptation protocol (SDAP) and packet data convergence protocol (PDCP) processing modules supporting a MgNB unit 104 and a SgNB unit 106 that encompasses the Radio Link Control (RLC), Medium Access Control (MAC), and Physical (PHY) layers of the radio stack. These layers collectively manage the communication protocols, medium access procedures, and physical layer interactions within the radio interface. In the context of the UE-CPE 102, there are two distinct stacks, each associated with the MCG and SCG, respectively.

A scheduler 116 at the MgNB 112 effectively oversees the management of Uplink (UL) and Downlink (DL) resources, collaborating with the SgNB scheduler 118 to optimize resource allocation for the UE-CPE 102. This includes judicious management of high-band and low-band frequencies. Additionally, the scheduler 116 at the MgNB 112 orchestrates the allocation of resources, encompassing both high-band and low-band frequencies. This allocation is meticulously designed in response to dynamic considerations such as network conditions, user-specific requirements, and Quality of Service (QOS) considerations. Notably, the UE-CPE 102 is equipped to transmit a Sounding Reference Signal (SRS) 124 and 126 via a radio 128, ensuring communication with a radio 120 located at the MgNB 112 and a radio 122 stationed at the SgNB 114.

The scheduler 116 processes the received Sounding Reference Signal (SRS) 124 to extract valuable insights, enabling informed decisions regarding resource allocation for the UE-CPE 102. In this process, the scheduler 116 references a collection of buffers to determine the optimal allocation of resources. These buffers, denoted as 130, store essential data and information pertaining to the UE-CPE's transmission requirements. By analyzing the SRS signal and consulting the buffers 130, the scheduler 116 comprehensively understands the current status of data transmissions facilitated by the UE-CPE 102.

The buffers 130 are in constant communication with a multitude of PDCPs 132, each serving as a crucial interface between the buffers 130 and the Service Data Adaptation Protocol (SDAP) 134. The PDCPs 132 play a pivotal role in facilitating channel bonding between the SDAP 134 and different cell groups, such as the Master Cell Group (MCG) and the Secondary Cell Group (SCG). This bonding occurs through either a radio or split bearer mechanism. The split bearer uniquely combines data traffic from the MCG and SCG, supporting efficient channel bonding with the SDAP 134.

Much like the MgNB 112, the SgNB 114 assesses and allocates frequency resources to the UE-CPE 102 based on the received information. The scheduler at the SgNB 114 effectively handles the received Sounding Reference Signal (SRS) 126 and references a dedicated set of buffers 138 associated with the SgNB 114. By processing the SRS signal and consulting these buffers, the scheduler 118 at the SgNB 114 gains insights, notably influenced by the Packet Data Convergence Protocols (PDCPs) 132 at the MgNB 112. Subsequently, this information is utilized to make informed decisions about the optimal allocation of resources for the imminent data transmission at the UE-CPE 102.

The SDAP 134 receives a plurality of QOS flows 136 that are defined in the user plane. Information related to the QoS flows 136 are contained in a QoS flow identifier (QFI), established through L3 signaling. The QFI is used to identify different QoS flows 136 within a connection associated with the data transmission. Each QoS flow is associated with specific quality of service parameters or QoS metrics. These QoS metrics can include priority, delay sensitivity, and bit rate requirements for different data flows. The scheduler 116 and 118 can process the QoS information received and prioritize different data flows based on the UE-CPE's 102 QoS requirements. The priority levels are often assigned to ensure that critical or time-sensitive data is given priority in transmission. The scheduler can allocate resources to the UE-CPE based on the prioritization of QoS flows and overall network conditions. In some cases, the scheduler can continuously adapt its determination on the allocation of resources based on changing network conditions, traffic patterns, and the real-time QoS requirements of different QoS Flows 136.

Once the schedulers 116 and 118 have determined an amount and type of network resources to allocate to the UE-CPE 102, each of the schedulers 116 and 118 can transmit the allocated resources to the UE-CPE 102 via the PDCCH in both the uplink and downlink through a CSI-RS 142 from the MgNB 112 and a CSI-RS 144 from the SgNB 114. The UE-CPE then uses the allocated resources from the MgNB 112 and SgNB 114 to send data to endpoints 140 in connection with the UE-CPE 102.

The UE-CPE 102, through the CSI-RS 134 and 136 signals received from the MgNB and SgNB, receives the network resource allocations, and the UE-CPE 102 can intelligently make decisions to optimize data transmissions to various endpoints 140 based on their individual requirements and network conditions. The endpoints 140 can include devices or applications within a home environment, including but not limited to smartphones, wearable devices, IoT devices, gaming consoles, tablets, computers, and laptops that rely on the UE-CPE 102 for internet access and data transmission.

In some cases, the disclosed embodiments may apply to modifying link adaptation control loops in 5G and LTE radios. This enables dynamic adjustment of radio resources to changes in radio conditions. These control loops function in both uplink (UL) and downlink (DL) scenarios. In the depicted scenario shown in FIG. 1, a dual connectivity configuration involves the deployment of two gNBs: MgNB 112 and SgNB 114. Both gNBs are equipped with conventional pairs of RAN schedulers, denoted as 116 and 118. Notably, MgNB 112 establishes a signaling connection (N2/N1) with the 5G Core (5GC).

The connection band directed from the SgNB radio stack 110 of the UE-CPE 102 is the low-coverage/high-throughput high band supported by SgNB 114. On the other hand, the connection band directed from the MgNB radio stack 108 of the UE-CPE 102 is the high-coverage/low-throughput low band supported by MgNB 112.

When data traffic is directed from SgNB 114, it goes through the PDCP 132 layer in MgNB 112, where the DL splitting/combining of DL/UL bearers occurs. Packet reordering for UL is also performed at the PDCP 132 layer in the UE-CPE 102.

A control loop is created from the MgNB radio stack 108 of the UE-CPE 102 to the MgNB 112 for the low-frequency bands, where a single MCG bearer is delivered from the PDCP 132 to the SDAP 134. A control loop is also created from the SgNB radio stack 110 of the UE-CPE 102 to the SgNB 114 for the high-frequency bands, where a single SCG bearer is delivered from the PDCP 132 to the SDAP 134. Additionally, two split bearers can be delivered from each of the MgNB 112 and the SgNB 114 through the PDCP 132 to the SDAP 134.

In some examples, the schedulers 116 and 118 of the MgNB 112 and the SgNB 114 operate in an uncoordinated fashion, with each being tasked with maintaining a minimum target Block Error Rate ($BLER_T$), which is typically 10% for Enhanced Mobile Broadband (eMBB) services. The operators want to provide a consistent service of a certain DL/UL ratio to subscribers. However, the conventional split bearer implementation typically prioritizes maximizing resource usage for each UE locally. Thus, each user receives the maximum throughput possible based on their specific radio frequency (RF) channel condition. However, this approach can have limitations with regard to spectral efficiency as it wastes high-band and low-band resources in relation to the downlink (DL) and uplink (UL) service definition.

A spectral efficient mix of resources primarily consists of high-band resources for UE near the tower. As the UE moves away from the tower location, a small number of low-band resources are progressively added to compensate for the loss of higher frequency capacity.

In some examples, a fixed wireless access network that uses spectrally efficient load distribution can increase the reach and number of subscribers by deploying the proper balance between downlink and uplink channels while conserving spectral resources in locations that require it the most. For operators, the goal is to support as many users as possible with consistent connectivity.

The following description pertains to configuring the UE-CPE 102 to distribute loads of spectral resources across different cell groups on varying frequencies. This is done to ensure that the DC mix of traffic arriving from multiple cells is optimized according to the available spectrum and the capacity and range of each frequency band that supports the service.

Figure 2:
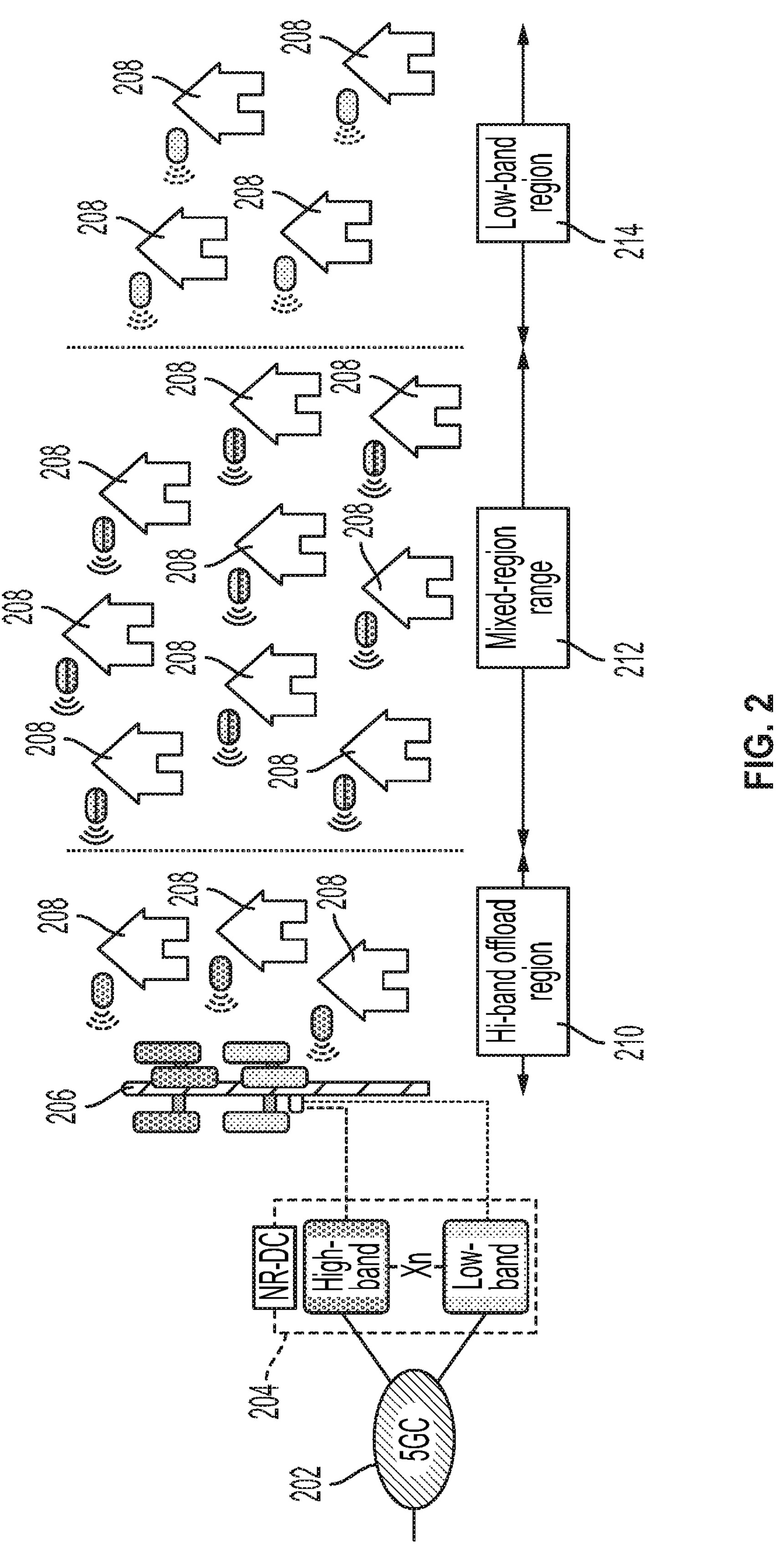
FIG. 2 illustrates an example distribution of multiple frequency bands for wireless communication in accordance with some examples of the disclosure.

FIG. 2 illustrates an example distribution of multiple frequency bands for wireless communication to a plurality of endpoints in accordance with some examples of the disclosure. In some examples, the paired dual connectivity scheduler 204 may include for example, the MgNB 112 scheduler 116 and SgNB 114 scheduler 118, respectively, as shown in FIG. 1. The dual connectivity scheduler 204 can allocate extra resources to users who have endpoints 140 located closer to a gNB 206 that is connected to the 5G Core (5GC) 202. On the other hand, users with endpoints 208 that are farther away from the gNB 206 will receive minimum network resources.

Referring to FIG. 2, the gNB 206 is capable of receiving a distribution of high-frequency band resources and low-frequency band resources from the dual connectivity scheduler 204. These resources can be used to provide connectivity to endpoints 208 located in the hi-band region 210, mixed-band region 212, and low-band region 214.

The dual connectivity scheduler 204 at the gNB 206 can assess the geographical layout of endpoints 208 in each of the hi-band region 210, mixed-band region 212, and low-band region 214 to strategically deploy resources to optimize network performance. The gNB 206 determines the proximity of the endpoints 208 to different frequency bands, facilitating the deployment of resources allocated by the dual connectivity scheduler 204.

In this example, the hi-band region 210, operating in the mmWave spectrum, consists of endpoints closer to the gNB 206. The dual connectivity scheduler 204 allocates a portion of the high-frequency band resources to this region to leverage the proximity, ensuring high data rates and low latency.

For the mixed-region range 212, the gNB 206 deploys another portion of high-frequency band resources, complemented by additional resources in the low-frequency band. This strategic allocation caters to the diverse needs of endpoints within this mixed region, optimizing both coverage and capacity.

In contrast, the low-band region 214, characterized by endpoints situated at a greater distance from the gNB 206, receives a majority of low-frequency band resources. This decision aligns with the superior coverage and penetration capabilities of low-frequency bands, ensuring a reliable and high-quality connection for endpoints in this region.

Embodiments herein are further configured to modify the link adaptation (LA) control loop in 5G and LTE radio to adjust radio resources dynamically to changes in radio conditions. The modification procedures of the control loops in UL and DL will now be discussed below, as shown in FIG. 3 and FIG. 4 when deployed in the dual connectivity configuration.

Figure 3:
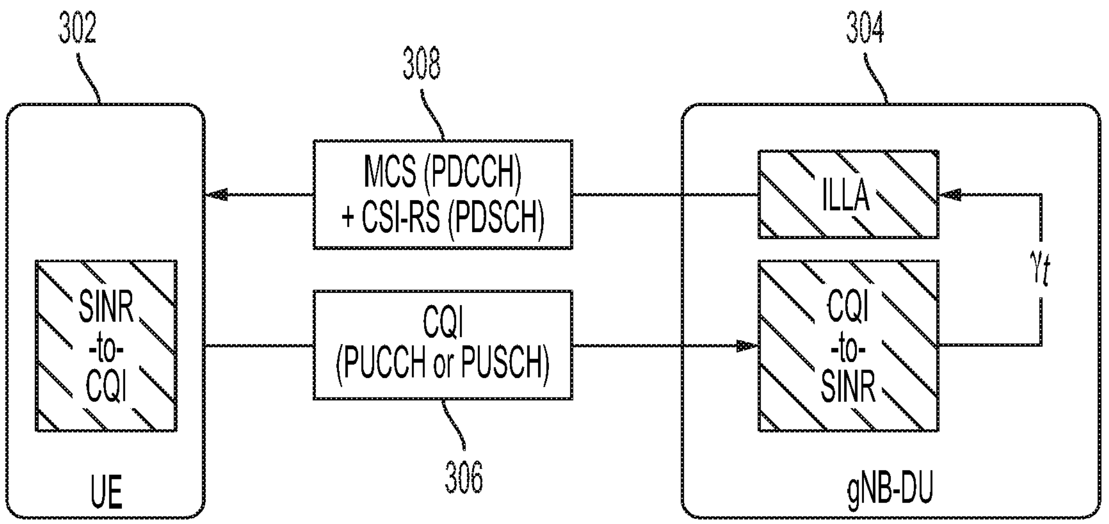
FIG. 3 illustrates an example downlink (DL) control loop in accordance with some examples of the disclosure.
Figure 4:
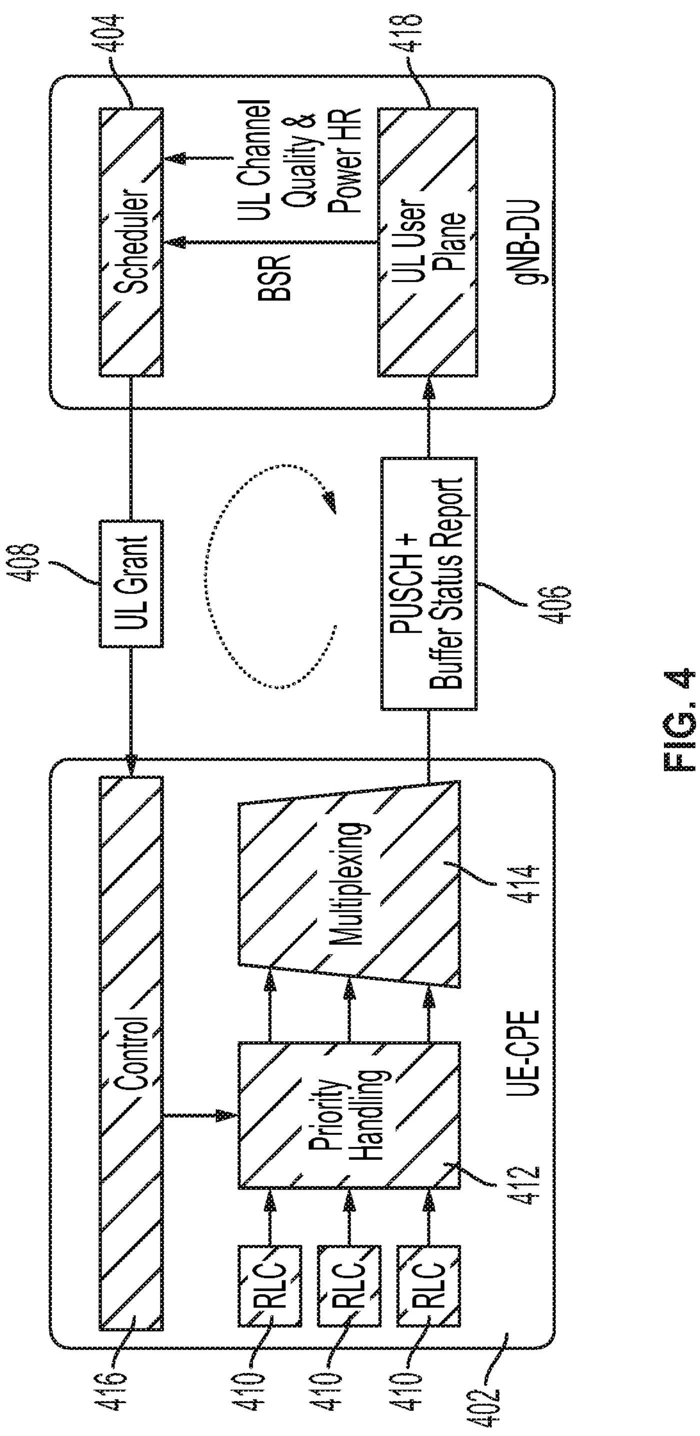
FIG. 4 illustrates an example uplink (UL) control loop in accordance with some examples of the disclosure.

FIG. 3 illustrates an example downlink (DL) control loop in accordance with some examples of the disclosure. In the DL direction, as illustrated in FIG. 3, the gNB-DU 304 incorporates the Modulation and Coding Scheme (MCS) into Physical Downlink Control Channel (PDCCH) in a first transmission 308, along with CSI-RS embedded into the Physical Downlink Shared Channel (PDSCH). Subsequently, the UE 302 extracts the Modulation and Coding Scheme (MCS) and Channel State Information-Reference Signal (CSI-RS) transmitted by the gNB-DU 304. These extracted parameters are utilized to generate a CQI index, influencing the modulation rate for resources allocated to the UE. Additionally, the process yields a Rank Indication (RI), represented as an integer signifying the extent of spatial diversity directed toward the UE. Furthermore, a Precoding Matrix Indication (PMI) is derived, serving as an index for a predefined precoding matrix at the gNB, which in turn directs beams to the UE. The combination of indices {COI, RI PMI} is then transmitted back to the gNB-DU 304 as channel state information (CSI) Report 306.

In the control loop of FIG. 3, the UE-CPE first computes an estimated signal to interference noise ratio (SINR) at the time step, denoted as from the embedded CSI-RS in the PDCCH. The SINR then determines the CQI to be passed up to the gNB-DU 304 in the physical uplink control channel (PUCCH), usually based on parameters known to the CPE vendor and kept proprietary. The gNB-DU 304 uses the CQI to reconstruct y, and passes this value to inter-gNB link aggregation (ILLA) elements, which determines the optimal MCS and number of resource elements (REs) ($N_{RE}$) for DL transmission. The $N_{RE}$ depends on how many other UE-CPEs are being co-scheduled. Being "work-conserving, the scheduler allocates as many $N_{RE}$ as it can without compromising buffer utilization. Then, the Transport Block ("TB") is built and passed on to the PHY layer.

In an example, the UE-CPE can be configured to select the lowest MCS and code rate that keeps the DL rate just above 100 Mbps and Block Error Rate (BLER)≈10%.

FIG. 4 illustrates an example uplink (UL) control loop in accordance with some examples of the disclosure. For the UE-CPE 402 to send any traffic in the UL, a UL grant 408 is to first be received from the gNB-DU scheduler 404. The process is initiated with a scheduling request (SR) from the UE-CPE 402 to the gNB-DU scheduler 404 on the PUCCH. The SR is sent whenever there is any pending data packet for the UL in the UE-CPE 102 after a period of inactivity. The gNB-DU scheduler 404, positioned in the MAC layer, responds to the SR with an initial UL grant 408 embedded as a downlink control information (DCI) format 0_0 or 0_1 within a PDCCH which results in the allocation of spectrum resources or frequency domain resources to the UE-CPE 402.

In an example, in order to process the UL grant 408, the UE-CPE 402 receives the UL grant 408 via a controller 416. The controller 416 communicates the UL grant and data included in the UL grant to a priority handler 412 that processes the uplink grant while simultaneously taking into account RLCs 410, contributing to determining the priority associated with the data. To assign rate priorities, the UE-CPE 402 comprises a priority handler 412 that is configured by radio resource control (RRC). This priority handler 412 assigns each logical channel (LC) a priority and a prioritized bit rate. The UE-CPE 402 then services its radio bearers in order of decreasing priority, usually using a proportional fair scheduling algorithm, unless UL QOS is configured.

Additionally, the UE-CPE 402 assesses the available throughput from the received spectrum allocation, code rate, and Modulation and Coding Scheme (MCS) in the uplink grant 408. This assessment is made in alignment with the priority associated with the data, ensuring that higher-priority data receives the resources for efficient transmission. Once the available throughput is determined, a Physical Uplink Shared Channel (PUSCH) 406 is generated from a multiplexer 414, incorporating the assessed information. The PUSCH 406 includes details about the allocated spectrum, code rate, MCS, and prioritized data, and is equipped with a Buffer Status Report (BSR), providing information about the amount of data waiting to be transmitted in the UL buffer. The generated PUSCH 406 is then sent to the gNB-DU 404 via the UL user plane 418, completing the uplink transmission process. Meanwhile, more data may continue to arrive at the uplink buffers. While the uplink buffer has not yet been emptied, the UE-CPE can repeat the process of sending BSRs and receiving uplink grants as illustrated in in the control loop illustrated in FIG. 4.

In some examples, the Uplink (UL) grants 408 may pertain to the entirety of the UE-CPE 402 rather than specific UL LCs. The iterative UL grant 408 process ensures comprehensive adjustments within the UE-CPE, facilitating synchronization of Uplink Buffer Status Reports (UL BSRs) with the targeted UL throughput. Simultaneously, it upholds a predefined BLER.

For example, the optimal performance of the UE-CPE may hinge on sustaining an uplink data rate capped at 10 Mbps. Adhering to this criterion, the UE-CPE can furnish BSRs, leading to a reduced Uplink (UL) throughput. However, this adjustment ensures that the intended BLER, gauged through Hybrid Automatic Repeat reQuest Negative-ACKnowledgments (HARQ NACKS), is still achieved. This method safeguards that the UE-CPE adheres to the designated rate for transmitting uplink data.

Figure 5A:
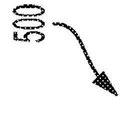
FIG. 5A illustrates an example process for DL resource distribution in accordance with some examples of the disclosure.
Figure 5A:
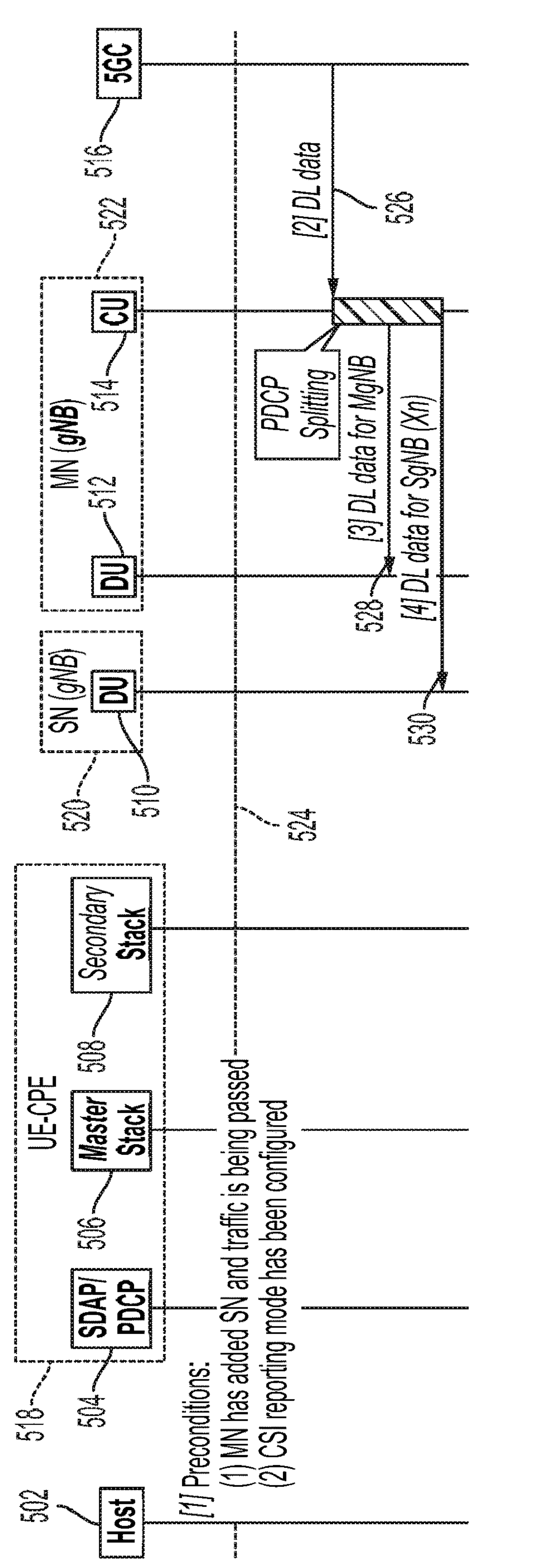
Figure 5B:
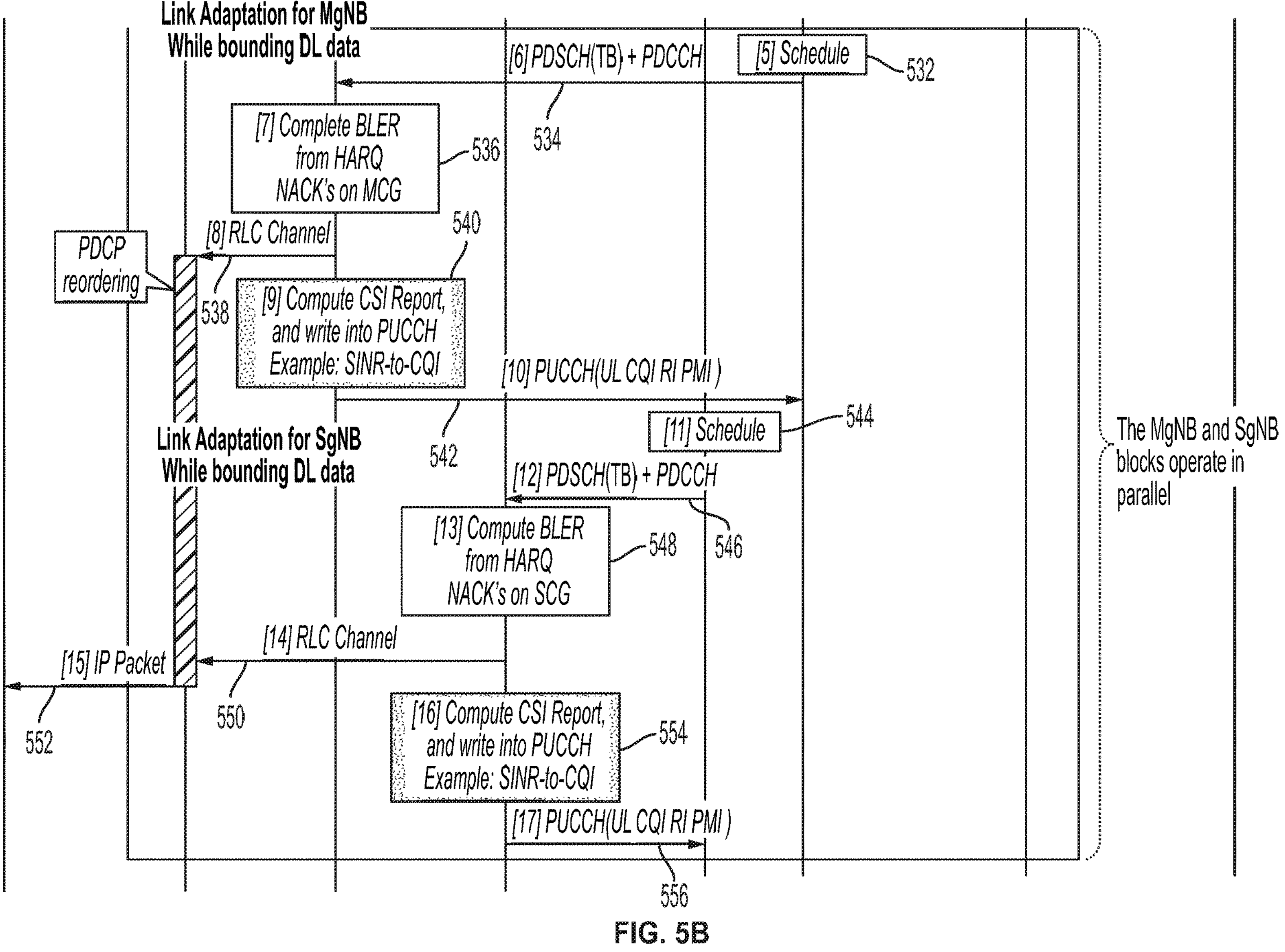
FIG. 5B illustrates a second iteration of the example process for DL resource distribution in accordance with some examples of the disclosure.

FIG. 5A-FIG. 5B illustrates an example process for DL resource distribution in accordance with some examples of the disclosure. The following disclosure outlines Steps 524-542, which describe the operation of the control loop for the MgNB.

According to example flow 500, at step 524, one or more preconditions can be met where the MgNB 522 is added to the SgNB 520, and data traffic is being passed between them.

At step 526, the 5GC 516 can transmit DL data to the MgNB control unit (CU) 514. The control unit can subsequently perform PDCP splitting of the DL data to be transmitted to the MgNB 522 and the SgNB 520.

At step 528, the MgNB CU 514 can transmit the DL data for the MgNB 522 to the MgNB distribution unit (DU) 512.

At step 530, the MgNB CU 514 can also transmit the DL data for the SgNB 520 to the SgNB DU 510.

Referring to FIG. 5B, at block 532, a scheduler at the MgNB 522 can decide on the allocation of data plane bits to DL REs and create a PDCCH to represent the allocation.

At step 534, an orthogonal frequency division multiplexing (OFDM) grid is created for a slot and sent downlink with a PDSCH and PDCCH. It can be assumed that one transport block (TB) or code block group (CBG) is carried by the PDSCH.

At block 536, the master stack 506 at the UE-CPE 518 can compute BLER from HARQ NACKS on the MCG.

At step 538, the RLC channel can transmit data bearers onto the PDCP layer for reordering and mapping.

At block 540, a CSI report can be computed and written into PUCCH. For example, the lowest MCD and code rate can be selected that keeps the DL rate above 100 Mbps (in our example) and BLER≈10%.

At step 542, the master stack 506 at the UE-CPE 518 can transmit the CSI report UL to the upstream MAC layer where it will be used in subsequent scheduling decisions at the MgNB DU 512.

The following disclosure outlines Steps 544-556, which describe an example operation of the control loop for the SgNB.

At block 544, the scheduler at the SgNB DU 510 can decide on the allocation of data plane bits to DL REs and create a PDCCH to represent the allocation.

At step 546, the SgNB DU 510 can transmit the send downlink a PDSCH and PDCCH carrying at least one TB or CBG.

At block 548, the secondary stack 508 at the UE-CPE 518 can compute BLER from HARQ NACKS on the SCG.

At step 550, the RLC channel can transmit data bearers from the secondary stack 508 to the SDAP/PDCP 504 on to the PDCP layer for reordering and mapping.

At step 552, an internet protocol (IP) packet is transmitted from the SDAP/PDCP 504 of the UE-CPE 518 to the host 502.

At block 554, a CSI report can be computed and written into PUCCH. For example, a SINR-to-CQI can be written into the PUCCH.

In accordance with the example described above regarding flow 500, each UE-CPE served is labeled with index J.

The throughput per cell group (CG={MCG, SCG}) at slot time t and for a UE-CPE labeled by J=1, . . . , K is denoted is $$C_t^{(j),CG}.$$

Thus, the throughput can be calculated for DL and for UL $$\left(C_{DL,t}^{(j),CG} \text{ and } C_{UL,t}^{(J),CG}\right).$$

The most basic form of the load distribution algorithm can be determined in accordance with the following process:

1. Each UE-CPE/maintains for every time step t:
   a. The running average of the SINR at time step t from DL reference symbols such as CSI-RS for the MCG and SCG is denoted as $$\overline{\gamma}_t^{(J),CG}$$

where CG∈{MCG, SCG}.
   b. A running average of DL throughput $$(\overline{C}_{CL,t}^{(J)})$$

over a configurable window, would be the DL throughput on the UE-CPE. The value of the DL throughput can be inferred or directly measured on the UE-CPE by a speed test.
   c. A running average of DL throughput A over a configurable window for each t.

$$\left(\text{i.e., } \overline{A}_t := (1/\tau)(A_t + \cdots + A_{t-(\tau-1)}\right):$$

d. A running average of Block Error Rate T per cell group $$\left((\overline{C}_{DL,t}^{(J),CG})\right)$$

over a configurable window as computed from received NACK messages in the HARQ.
2. The UE-CPE can transform the SINR estimates CG into a CQI for each $$\overline{C}_{DL,t}^{(J)} \geq \overline{C}_{DL,t}^{(J),MCG} + \overline{C}_{DL,t}^{J,SCG}.$$

The steps for the transformation from SINR to CQI are discussed in steps 540 to 554 in flow 500 of FIG. 5. Additionally, the UE-CPE consults the tables found in technical standard (TS) 38.214 [8] for NR and TS 36.213 for LTE using the following criteria:
   a. If $$(\overline{BLER}_{DL,t}^{(J),CG})$$

is within tolerance bounds of the target DL throughput (e.g., 100 Mbps), and CG is within the tolerance bounds of the target threshold (e.g., 10%), then the CQI can be selected for each $$\overline{\gamma}_t^{(J),CG}$$

as per tables in TS 38.214 using CG∈{MCG, SCG} inferred from the reference symbols.
   b. If $$\overline{C}_{DL,t}^{(J)}$$

is not within tolerance bounds of the target DL throughput (e.g., 100 Mbps), but $$\overline{BLER}_{DL,t}^{(J),CG}$$

and CG are within the tolerance bounds then the MCS is adjusted in the next time step for SCG (the high band). The SCG is adjusted to be the next highest or next lowest from the one currently selected depending on whether BLER is over or under bounds. The adjusted SCG is then used to select the CQI with the lowest code rate allowed for by the current SINR $$(\overline{\gamma}_{DL,t}^{(J),CG}).$$

i. If this step had been taken prior and results in unacceptable $$\overline{C}_{DL,t}^{(J)},$$

or if SCG is already operating at the highest MCS and lowest code rate, it means $$\overline{BLER}_t^{(J),MCG}$$

is not achievable by using SCG, resulting in an attempt to use MCG.
      ii. If the MCG adjustment fails (e.g., results in unacceptable $$\overline{BLER}_t^{(J),SCG}$$

the configured service rate is considered to not be achievable for the selected customer, and a recommendation is provided to transition the customer to a lower-grade service plan as defined by the DL/UL.

c. If $$\overline{Y}_t^{(J),CG}$$

is within tolerance bounds of the target DL throughput, but neither of the $$\overline{BLER}_t^{(J),SCG}$$

is outside the tolerance bounds, the coding rates are adjusted. The coding rates are adjusted to be the next highest or next lowest from the coding rate currently selected depending on whether $$\overline{C}_{DL,t}^{(J)}$$

is over or under bounds. The coding rate is then used to select the CQI.

i. If this step had been taken prior and results in unacceptable $$\overline{BLER}_t^{(J),MCG},$$

or if SCG is already operating at the highest MCS and lowest code rate, it means the $$\overline{C}_{DL,t}^{(J)}$$

is not achievable by using the SCG, resulting in an attempt to use MCG.

d. If the MCS adjustment fails (e.g., resulting in an unacceptable $\overline{\text{BLER}}$), the configured service rate is not achievable for the selected customer, and a configuration including a service plan is defined by the feasible DL/UL.

e. If both $\overline{\text{BLER}}$ and $$\overline{C}_{DL,t}^{(J)}$$

are outside the bounds, then both MCS and the coding rate are adjusted accordingly.

3. The gNB-DU will consider the CQI to conserve its workload and create a scheduling plan based on the Quality-of-Service Class Identifier (QCI) conveyed. It is important to note that this is not a Guaranteed Bit Rate (GBR) packet data unit (PDU) session. Instead, the plan is optimized to fulfill the expected requirements of the Downlink/Uplink (DL/UL) data transmission.

4. In some instances, it may be that the UE-CPE is unable to converge to the desired DL/UL rates. In that case, the UE-CPE can notify a server in the IP network to use a consistently achievable value for $$\overline{C}_{DL,t}^{(J)}$$

to form the basis of a billing plan from the operator.

In 5G, the standard link adaptation (LA) channel state vector is augmented with additional parameters that include selection of numerology, Bandwidth Part (BWP), power level of the UE, Remote Interference Management, and beam parameters.

In some examples, examples disclosed with regards to FIG. 5 can further be applicable to resolve issues with augmented parameters. The resolution can be provided by the following:

The weighted running average of $$\overline{BLER}_t^{(J),MCG}$$

at time step $$\overline{C}_{DL,t}^{(J)}$$

is defined to be $\overline{\text{BLER}}_t$, where the value $$\overline{C}_{DL}^{(J)}$$

is the window of the running average.

Figure 6A:
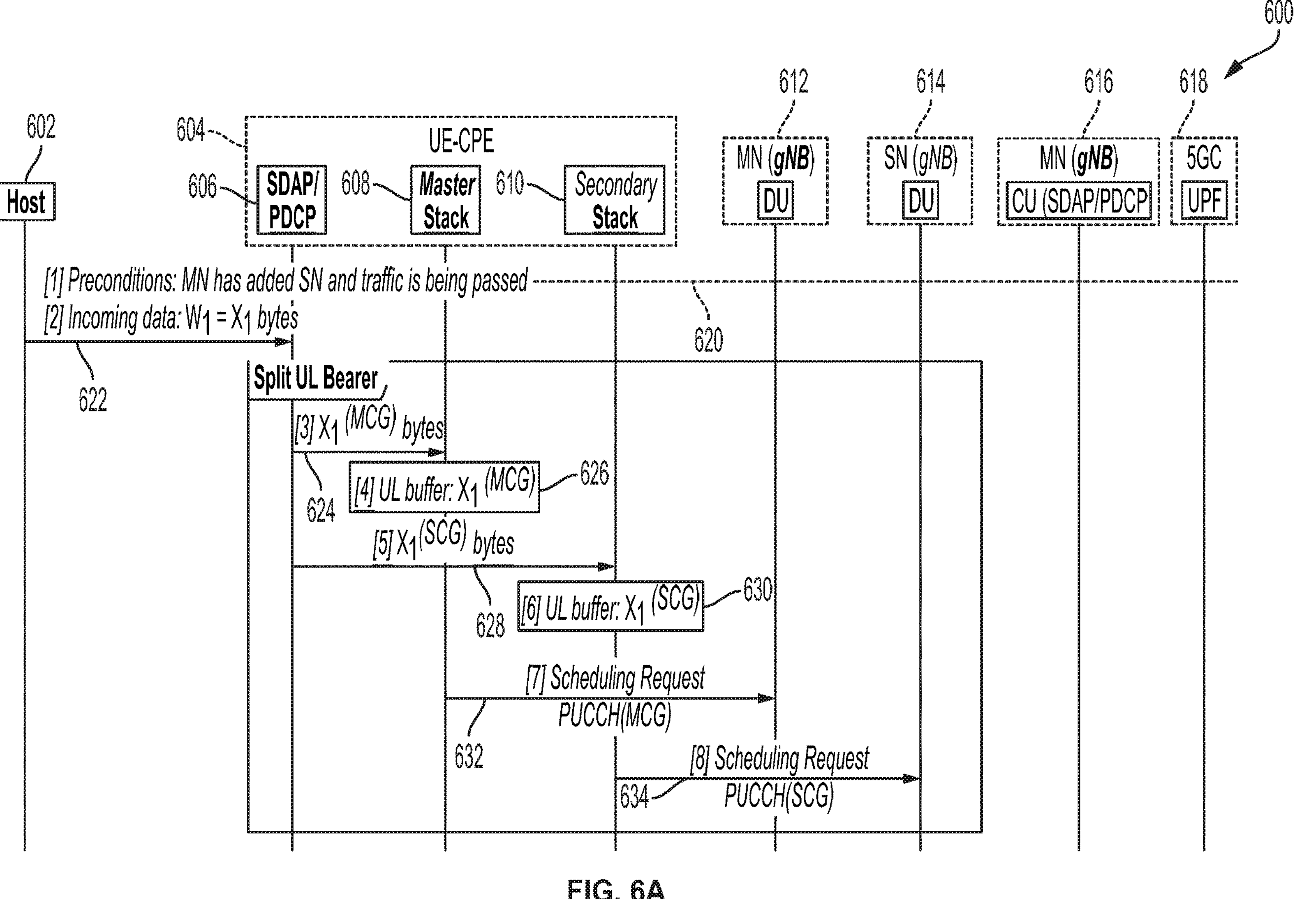
FIG. 6A illustrates an example process for UL resource distribution in accordance with some examples of the disclosure.
Figure 6B:
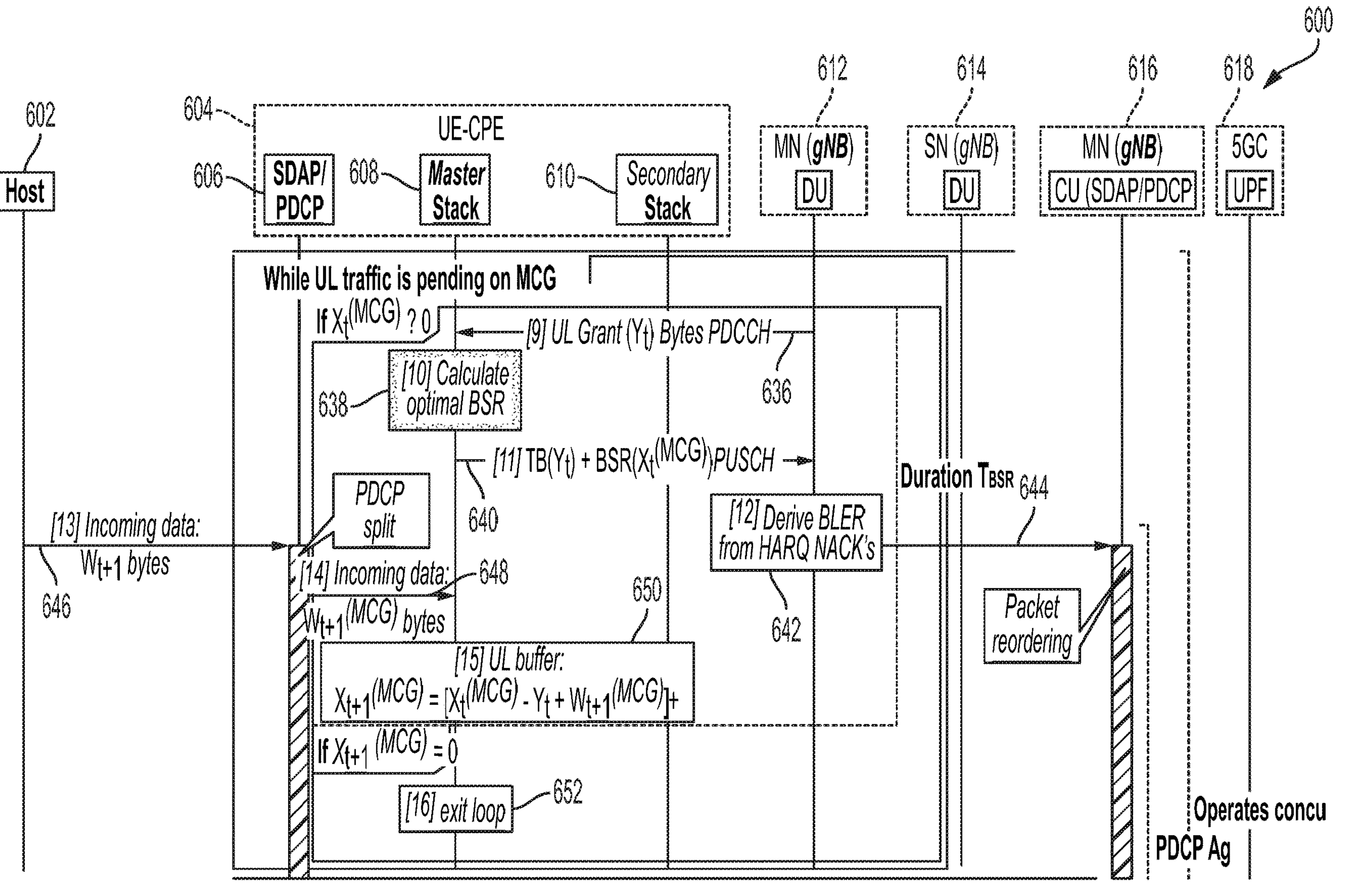
FIG. 6B illustrates a second iteration of the example process for UL resource distribution in accordance with some examples of the disclosure.
Figure 6C:
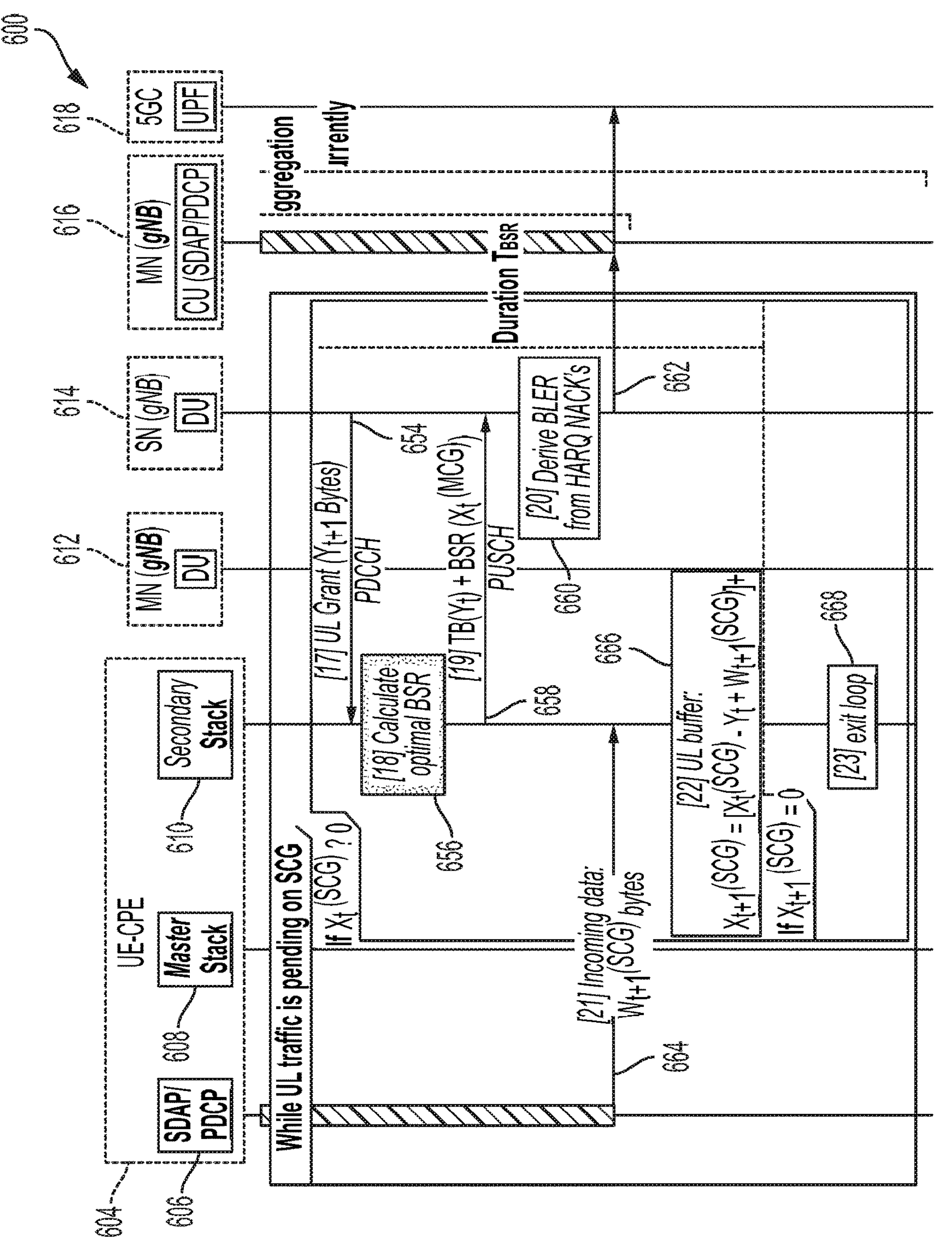
FIG. 6C illustrates a third iteration of the example process for UL resource distribution in accordance with some examples of the disclosure.

FIG. 6A-6C illustrates an example process for UL resource distribution in accordance with some examples of the disclosure.

At step 620 of example flow 600, it is assumed that the MgNB DU 612 has added the SgNB DU 614 and is exchanging data traffic between them. It is further assumed that the buffers in the UE-CPE 604 are empty as denoted by the following equation $$\left(X_t^{(MCG)} = X_t^{(SCG)} = 0\right).$$

At step 622, a local network host 602 sends traffic of $W_1=X_1$ bytes to the UE-CPE, which assumes, without loss of generality, that the UE-CPE 604 is intended for FWA (for example, a router with a 5G interface).

At step 624, an $$X_1^{(MCG)}$$

of bytes is transmitted from the SDAP/PDCP 606 to the secondary stack 610 of the UE-CPE 604. The PDCP layer in the UE-CPE is responsible for splitting the traffic on per packet basis. Any initial split will self-adjust. For instance, the initial plan to split the traffic could be to direct all traffic to the secondary "high band" stack instead of using up resources in the more abundant band first.

At block 626, the $$Xt^{(MCG)}$$

of bytes is allocated to one of the UL buffers by the master stack 608.

At step 628, an $$X_t^{(SCG)}$$

of bytes is transmitted from the SDAP/PDCP 606 to the secondary stack 610.

At block 630, the $$X_t^{(SCG)}$$

of bytes is allocated to one of the UL buffers by the secondary stack 610.

At step 632, the master stack 608 sends a scheduling request including a PUCCH related to the MCG to the MgNB DU 612.

At step 634, the secondary stack 610 sends a scheduling request, including a PUCCH related to the SCG, to the SgNB DU 614.

The following disclosure outlines Steps 636-652, which describe the operation of a control loop while UL data traffic is pending in the MCG.

At step 636, the previously received scheduling request in step 634 is responded to with an UL grant, in a PDCCH, from the MAC scheduler in the MgNB DU 612.

At block 638, an optimal BSR to align with the UL service requirement is calculated.

At step 640, the UL data is sent in the PUSCH, and a corresponding BSR accompanies the data, where the BSR assumes $$X_1^{(MCG)}$$

bytes are in the UL buffer.

At block 642, the MgNB DU infers BLER from NACKs in UL HARQ. Data is then forwarded to the PDCP layer in MgNB, where it is reordered and combined into an N3 interface.

At step 644, the MgNB DU 612 passes data bearers is passed on to PDCP layer at the MgNB CU 616 for packer recording and mapping back into IP.

At step 646, the SDAP/PDCP 606 receives incoming data, with $W_{t+1}$ bytes, from the host 602 at the MAC layer buffer, where PDCP splitting is performed.

At step 648, the SDAP/PDCP 606 sends the incoming data, with $W_{t+1}^{MCG}$ bytes, to the master stack 608 in the UE-CPE 102.

At block 650, the data in the UL buffer is updated according to the following equation:

$$X_{t+1}^{MCG} = \left[X_t^{MCG} + Y_t^{MCG} + W_{t+1}^{MCG}\right]^+.$$

At block 652, if the UL buffer in the MCG is determined to be empty, or shows a negative balance, the control loop is exited, otherwise, the loop continues.

FIG. 6C illustrates a third iteration of the example process for UL resource distribution in accordance with some examples of the disclosure.

The following disclosure outlines Steps 654-668, which describe the operation of a control loop while UL data traffic is pending in the SCG.

At step 654, the previously received scheduling request in step 634 is responded to with an UL grant including $Y_{t+1}$ bytes, in a PDCCH, from the MAC scheduler in the SgNB DU 614.

At block 656, an optimal BSR to align with the UL service requirement is calculated.

At step 658, the UL data is sent in the PUSCH, and a corresponding BSR accompanies the data, where the BSR assumes $$Y_t^{SCG}$$

bytes are in the UL buffer.

At block 660, the SgNB DU 614 infers BLER from NACKs in UL HARQ. Data is then forwarded to the PDCP layer in SgNB, reordered and combined into an N3 interface.

At step 662, the SgNB DU 614 passes data bearers is passed on to PDCP layer at the MgNB CU 616 for packer recording and mapping back into IP, where the IP is forwarded to the 5GC user plane function (UPF) 618.

At step 664, the SDAP/PDCP 606 sends a plurality of incoming data, with $W_{t+1}^{SCG}$ bytes, to the secondary stack 610 in the UE-CPE 102.

At step 666, the data in the UL buffer is updated according to the following equation:

$$X_{t+1}^{SCG} = \left[X_t^{MCG} + Y_t^{SCG} + W_t^{SCG}\right]^+.$$

At block 668, if the UL buffer in the SCG is determined to be empty or shows a negative balance, the control loop is exited. Otherwise, the loop continues.

In accordance with the example described above regarding flow 600, a split bearer operation can be configured on the UE-CPE via RRC signaling.

Figure 7:
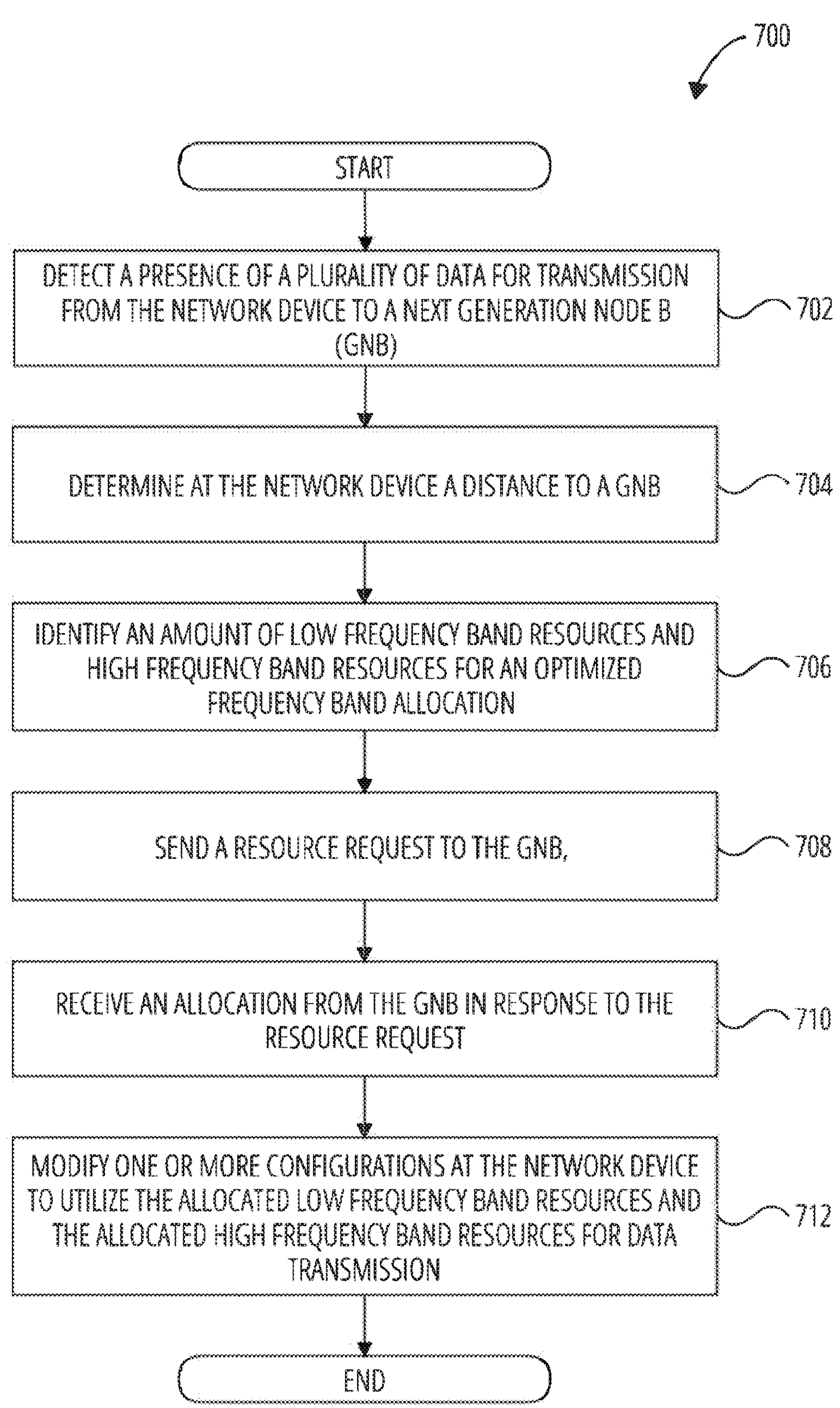
FIG. 7 illustrates a flow chart for dual connectivity at a UE in a wireless communication system in accordance with some examples of the disclosure.

FIG. 7 illustrates a flow chart for dual connectivity at a UE in a wireless communication system in accordance with some examples of the disclosure. FIG. 7 in some examples can be implemented as an alternative to or in combination with the process flows of FIG. 5 and FIG. 6A-6C. Although the example process 700 depicts a particular sequence of operations, the sequence may be altered without departing from the scope of the present disclosure. For example, some of the operations depicted may be performed in parallel or in a different sequence that does not materially affect the function of the process 700. In other examples, different components of an example device or system that implements the process 700 may perform functions at substantially the same time or in a specific sequence.

In the context of a dual connectivity network, the configuration and deployment of network resources, particularly in relation to a UE-CPE, play a pivotal role in optimizing spectral efficiency. For example, in a network designed to cater to endpoints situated at varying distances from the UE-CPE, distance can play a significant impact on the quality of wireless connectivity.

The UE-CPE is equipped with the capability to deploy both low-frequency band resources and high-frequency band resources to serve the endpoints effectively. The allocation of resources is a dynamic process, considering the spatial distribution of the endpoints and their corresponding distance from the UE-CPE. This strategic allocation ensures that the spectral resources are utilized efficiently, taking into account the propagation characteristics of both low and high-frequency bands. This is particularly relevant to network operators who define DL/UL service plans based on the maximum throughputs achievable, as measured by a speed tester. In conventional approaches, where plans are in effect, allocating the maximum available spectral resources at the UE-CPE location often results in inefficiencies. The spectral resources are wasted by delivering beyond the contracted rate specified in the service plan.

An example process 700 is described below, along with one or more embodiments of the disclosed technology, that discriminately allocates network resources in a spectrally efficient manner, adhering to the contracted rate and avoiding unnecessary waste.

In block 702, process 700 includes detecting a presence of a plurality of data for transmission from the UE to a gNB. For example, the UE-CPE 102 illustrated in FIG. 1 may detect a presence of a plurality of data for transmission from the UE to a gNB. In some examples, the detection of the one or more data packets pending in one or more buffers of the UE is based on a predetermined threshold of inactivity.

Further, the process 700 comprises determining a data rate of the plurality of data for transmission between the UE and the gNB. For example, the UE-CPE 102 illustrated in FIG. 1 may determine a data rate of the plurality of data for transmission between the UE and the gNB.

Further, the method comprises generating a plurality of recommendations to improve data rate in response to the data rate not meeting a predetermined threshold. For example, the UE-CPE 102 illustrated in FIG. 1 may in response to the data rate not meeting a predetermined threshold generate a plurality of recommendations to resolve the underperformance of the data rate of the data for transmission between the UE and the gNB.

For example, the UE-CPE 102 illustrated in FIG. 1 can generate a first recommendation to transmit to the gNB, advising an update to the low-frequency bands and high-frequency band resources allocated for data packet transmission to the UE.

For example, the UE-CPE 102 illustrated in FIG. 1, can generate a second recommendation to transmit to the UE, directing the allocation of one or more priorities for the transmission of a first set of data packets in the plurality of data.

In block 704, process 700 includes determining at the UE a distance to a gNB. For example, a UE-CPE 102 illustrated in FIG. 1 may determine via the 5GC 202 illustrated in FIG. 2 a distance from one or more endpoints 140 to the gNB 206.

In block 706, process 700 includes, based on the determined distance, identifying an amount of low-frequency band resources and high-frequency band resources for an optimized frequency band allocation at block 706. For example, the UE-CPE 102 illustrated in FIG. 1 may identify based on the determined distance, an amount of low frequency band resources and high frequency band resources for an optimized frequency band allocation.

In block 708, process 700 includes sending a resource request to the gNB. For example, the UE-CPE illustrated in FIG. 1 may send a resource request to the MgNB 112 and the SgNB 114. In some examples, the MgNB 112 and the SgNB 114 processes the resource request based on the type of data packet. In some examples, the resource request includes information specifying the identified amount of low-frequency band resources and high-frequency band resources for one or more connected devices. In some examples, the resource request comprises information indicative of a type of data packet.

Further, the process 700 comprises determining based on the resource request one or more spectral resources to allocate to the UE to facilitate the data transmission. For example, the scheduler 116 illustrated in FIG. 1 may determine based on the resource request one or more spectral resources to allocate to the UE-CPE 102 to facilitate the data transmission.

Further, the process further comprises identifying by a scheduler of the gNB a first-time period to transmit a first portion of the one or more spectral resources to the UE, and a second time period to transmit the second portion of the one or more spectral resources. For example, the MgNB 112 illustrated in FIG. 1 may identify by a scheduler 116 of the MgNB 112 a first-time period to transmit a first portion of the one or more spectral resources to the UE-CPE 102, and a second time period to transmit the second portion of the one or more spectral resources. In some examples, the scheduling of the first portion of the one or more spectral resources is based on a priority assigned to one or more data packets by the UE-CPE 102.

Further, the process comprises transmitting to the UE a response to the request comprising an initial uplink grant, including the allocation of one or more spectral resources at the first and second time periods. For example, the scheduler 116 illustrated in FIG. 1 may transmit to the UE-CPE 102 a response to the request comprising an initial uplink grant including the allocation of the one or more spectral resources at the first and second time period.

In block 710, the process 700 includes receiving an allocation from the gNB in response to the resource request at block 710. For example, the UE-CPE 102 illustrated in FIG. 1 may receive an allocation from the MgNB 112 in response to the resource request. In some examples, the allocation specifies allocated low-frequency band resources and allocated high-frequency band resources. In some examples, the allocation received is based on a per-subscriber allocation defined as part of a service plan of one or more operators.

Further, process 700 includes adjusting the allocation at the gNB and specifying a set of low-frequency band resources and high-frequency band resources based on real-time network conditions. For example, the scheduler 116 illustrated in FIG. 1 may adjust the allocation at the MgNB 112, specifying a set of low-frequency and high-frequency and band resources based on real-time network conditions.

Further, process 700 comprises analyzing the allocation from the gNB to identify when the allocation of the low-frequency band resources and the high-frequency band resources reach a predetermined ratio. For example, the UE-CPE 102 illustrated in FIG. 1 may analyze the allocation from the MgNB 112 to identify when the allocation of the low-frequency band resources and the high-frequency band resources reach a predetermined ratio.

Further, process 700 includes in response to the low-frequency band resources and the high-frequency band resources not meeting the predetermined ratio, prompting the gNB to generate a second set of low-frequency band and high-frequency band resources for transmission to the UE.

For example, the UE-CPE 102 illustrated in FIG. 1 may, in response to the low-frequency band resources and the high-frequency band resources not meeting the predetermined ratio, prompt the MgNB 112 to generate a second set of low-frequency band and high-frequency band resources for transmission to the endpoints.

Further, the process 700 includes establishing two independent control loops for uplink transmission and downlink transmission. For example, the UE-CPE illustrated in FIG. 1 may establish two independent control loops for uplink transmission and downlink transmission. In some examples, the UE-CPE may include a controller configured to perform one or more steps for the control loops for uplink and downlink transmission.

For example, the controller 416 of the UE-CPE 402 illustrated in FIG. 4 can determine an optimized frequency band allocation for transmitting the plurality of data based on the distance to the gNB. The controller can further be configured to send a resource request to the gNB. In some examples, the resource request comprises the identified amount of low-frequency band resources and high-frequency band resources for one or more connected devices. The controller 416 can further be configured to receive an allocation from the gNB in response to the resource request. The allocation can specify a set of allocated low-frequency and high-frequency band resources. The controller 416 can further be configured to evaluate the received allocation to identify one or more compatible resources applicable to the resource request. The controller 416 may further be configured to transmit a second resource request based on the evaluation. In some examples, the second resource request includes identifying one or more additional uplink or downlink spectral resources for data transmission.

In block 712, process 700 includes modifying one or more configurations at the UE to configure one or more connected devices to utilize the allocated low-frequency band resources and the allocated high-frequency band resources for data transmission. For example, the scheduler 116 illustrated in FIG. 1 may modify one or more configurations at the UE-CPE 102 to configure the endpoints 140 to utilize the allocated low-frequency band resources and the allocated high-frequency band resources for data transmission.

Further, the process 700 includes detecting one or more CSI-RS inserted into a PDSCH by the gNB. For example, the UE-CPE 102 illustrated in FIG. 1 may detect one or more CSI-RS 142 inserted into a PDSCH by the MgNB 112.

Further, the process 700 includes generating a rank indication (RI) from a CSI-RS. For example, the UE-CPE 102 illustrated in FIG. 1 may generate a rank indication (RI) from a CSI-RS 142. In some examples, the RI is conveyed to the MgNB 112 through the resource request, to provide information about a degree of spatial diversity towards a user device.

Further, the method comprises generating a precoding matrix indication (PMI) from a CSI-RS. For example, the UE-CPE 102 illustrated in FIG. 1 may generate a PMI from a CSI-RS 142. In some examples, the PMI indexes a known precoding matrix at the gNB that steers beams to the UE.

Further, the process 700 includes generating a CQI from the CSI-RS. For example, the UE-CPE 102 illustrated in FIG. 1 may generate a CQI from the CSI-RS 142. In some examples, said CQI index is transmitted to the MgNB 112 in subsequent scheduling requests to inform of a modulation rate for spectral resources directed to the UE.

Further, the process further includes a deep reinforcement engine embedded in the UE configured to assist with the allocation of high and low-frequency band resources. For the deep reinforcement engine can monitor one or more parameters associated with the resource request from the UE. The deep reinforcement engine can monitor one or more parameters associated with the allocation of a set of low frequency band resources and high frequency band resources in response to the resource request. The deep reinforcement engine can generate, based on the monitored parameters, one or more updates to the allocation of low frequency and high frequency band resources.

Further, the process includes monitoring one or more parameters associated with the resource request from the UE. For example, the MgNB 112 illustrated in FIG. 1 may monitor one or more parameters associated with the resource request from the UE-CPE 102.

Further, the method comprises monitoring one or more parameters associated with the allocation of a set of low frequency band resources and high frequency band resources in response to the resource request. For example, the MgNB 112 illustrated in FIG. 1 may monitor one or more parameters associated with the allocation of a set of low frequency band resources and high frequency band resources in response to the resource request from the UE-CPE 102.

Further, the process 700 includes generating, based on the monitored parameters, one or more updates to the allocation of low frequency and high frequency band resources. For example, the scheduler 116 illustrated in FIG. 1, based on the monitored parameters, generate one or more updates to the allocation of low frequency and high frequency band resources to allocate to the UE-CPE 102.

Figure 8:
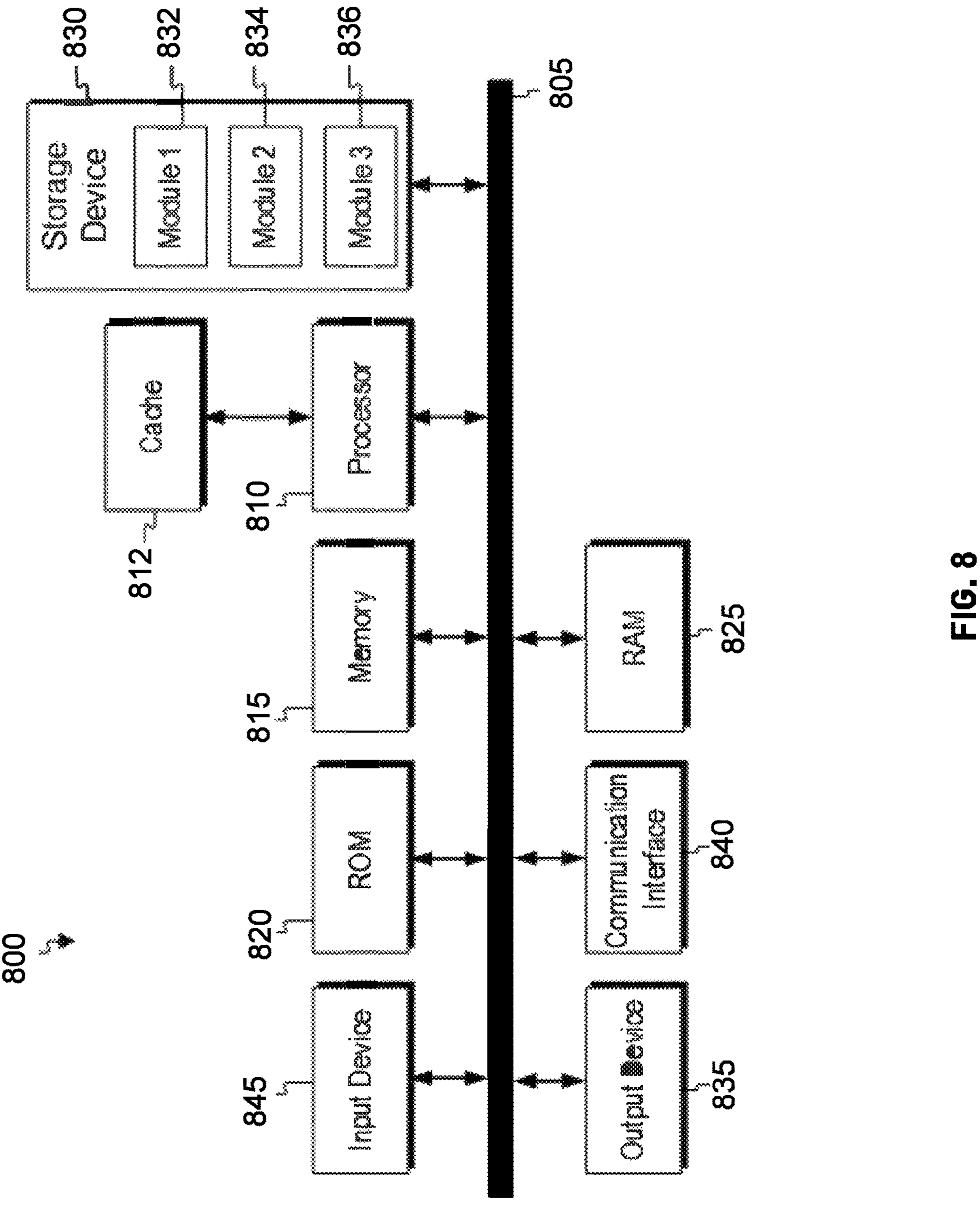
FIG. 8 shows an example computing system, which can be for example any computing device that can implement components of the system in accordance with some examples of the disclosure.

FIG. 8 shows an example of computing system 800, which can be for example any computing device making up a wireless communication system for distribution of network resources of FIGS. 1-4 or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments computing system 800 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read only memory (ROM) 820 and random-access memory (RAM) 825 to processor 810. Computing system 800 can include a cache of high-speed memory 812 connected directly with, in close proximity to, or integrated as part of processor 810.

Processor 810 can include any general-purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Some clauses of the present technology include:

Clause 1. A method for dual connectivity at a user equipment (UE) in a wireless communication system, the method comprising: determining at a UE a preferred allocation of multiband resources to be allocated by a gNB; sending, by the UE, a request to the gNB that includes data effective to cause the gNB to respond by allocating the preferred allocation of multiband resources; and receiving a first allocation of the multiband resources from the gNB, wherein the gNB provides the first allocation of the multiband resources based on the data effective to cause the gNB to allocate the preferred allocation of multiband resources.

Clause 2. The method of clause 1, wherein the preferred allocation is based on a determined distance from the gNB, the distance from the gNB is determined from a signal to interface plus noise ratio (SINR), where a greater proportion of noise in the SINR corresponds with a greater distance from the gNB.

Clause 3. The method of clause 1, wherein the request to the gNB that includes the data effective to cause the gNB to respond by allocating the preferred allocation of multiband resources is a scheduling request specifying an amount of low frequency band resources and high frequency band resources for the UE.

Clause 4. The method of clause 1, further comprising: processing at the gNB the resource request, the processing including: determining based on the resource request one or more spectral resources to allocate to the UE to facilitate transmission of the data; identifying by a scheduler of the gNB a first-time period to transmit a first portion of the one or more spectral resources to the UE, and a second time period to transmit the second portion of the one or more spectral resources, wherein the scheduling of the first portion of the one or more spectral resources is based on a priority assigned to one or more data packets by the UE; and transmitting to the UE a response to the request comprising an initial uplink grant including the allocation of the one or more spectral resources at the first and second time period.

Clause 5. The method of clause 3, further comprising determining a data rate of a plurality of data for transmission between the UE and the gNB; in response to the data rate not meeting a predetermined threshold: generating a first recommendation to transmit to the gNB, advising an update to the low frequency band and high-frequency band resources allocated for data packet transmission to the UE; and generating a second recommendation to transmit to the UE, directing the allocation of one or more priorities for the transmission of a first set of data packets in the plurality of data.

Clause 6. The method of clause 3, further comprising a controller in communication with the gNB and the UE, wherein the controller is configured to: analyze the allocation from the gNB to identify when the allocation of the low frequency band resources, and the high frequency band resources reach a predetermined ratio; and in response to the low frequency band resources and the high frequency band resources not meeting the predetermined ratio, prompt the gNB to generate a second set of low frequency band and high frequency band resources for transmission to the UE.

Clause 7. The method of clause 1, further comprising: adjusting, at the gNB, the allocation specifying a set of low frequency band resources and high frequency band resources based on real-time network conditions, wherein the adjustment is determined by the gNB.

Clause 8. The method of clause 1, further comprising a deep reinforcement engine configured to: monitor one or more parameters associated with the resource request from the UE; monitoring one or more parameters associated with the allocation of a set of low frequency band resources and high frequency band resources in response to the resource request; and based on the monitored parameters, generate one or more updates to the allocation of low frequency and high frequency band resources.

Clause 9. The method of clause 3, further comprising establishing two independent control loops for uplink transmission and downlink transmission, wherein the UE comprises a controller configured to: determine an optimized frequency band allocation for transmitting a plurality of data based on a distance to the gNB; send a resource request to the gNB, the resource request comprising the specified amount of low frequency band resources and high frequency band resources for one or more connected devices; receive an allocation from the gNB in response to the resource request, the allocation specifying a set of allocated low frequency band resources and allocated high frequency band resources; evaluate the received allocation to identify one or more compatible resources applicable to the resource request; and transmit a second resource request based on the evaluation, the second resource request including an identification of one or more additional uplink or downlink spectral resources for data transmission.

Clause 10. A user equipment (UE) comprising: a transceiver; a processor configured to execute instructions and cause the processor to: determine at a UE a preferred allocation of multiband resources to be allocated by a gNB; send, by the UE, a request to the gNB that includes data effective to cause the gNB to respond by allocating the preferred allocation of multiband resources; and receive a first allocation of the multiband resources from the gNB, wherein the gNB provides the first allocation of the multiband resources based on the data effective to cause the gNB to allocate the preferred allocation of multiband resources.

Clause 11. The UE of clause 10, wherein the preferred allocation is based on a determined distance from the gNB, the distance from the gNB is determined from a signal to interface plus noise ratio (SINR), where a greater proportion of noise in the SINR corresponds with a greater distance from the gNB.

Clause 12. The UE of clause 10, wherein the request to the gNB that includes the data effective to cause the gNB to respond by allocating the preferred allocation of multiband resources is a scheduling request specifying an amount of low frequency band resources and high frequency band resources for the UE.

Clause 13. The UE of clause 12, wherein the instructions further cause the processor to: process at the gNB the resource request, the processing including: determine based on the resource request one or more spectral resources to allocate to the UE to facilitate transmission of the data; identify by a scheduler of the gNB a first-time period to transmit a first portion of the one or more spectral resources to the UE, and a second time period to transmit the second portion of the one or more spectral resources, wherein the scheduling of the first portion of the one or more spectral resources is based on a priority assigned to one or more data packets by the UE; and transmit to the UE a response to the request comprising an initial uplink grant including the allocation of the one or more spectral resources at the first and second time period.

Clause 14. The UE of clause 12, wherein the instructions further cause the processor to: analyze the allocation from the gNB to identify when the allocation of the low frequency band resources, and the high frequency band resources reach a predetermined ratio; and in response to the low frequency band resources and the high frequency band resources not meeting the predetermined ratio, prompt the gNB to generate a second set of low frequency band and high frequency band resources for transmission to the UE.

Clause 15. The UE of clause 10, wherein the instructions further cause the processor to: adjust, at the gNB, the allocation specifying a set of low frequency band resources and high frequency band resources based on real-time network conditions, wherein the adjustment is determined by the gNB.

Clause 16. The UE of clause 10, wherein the instructions further cause the processor to: monitor one or more parameters associated with the resource request from the UE; monitor one or more parameters associated with the allocation of a set of low frequency band resources and high frequency band resources in response to the resource request; and based on the monitored parameters, generate one or more updates to the allocation of low frequency and high frequency band resources.

Clause 17. The UE of clause 12, wherein the instructions further cause the processor to: establish two independent control loops for uplink transmission and downlink transmission, wherein the UE comprises a controller configured to: determine an optimized frequency band allocation for transmitting a plurality of data based on a distance to the gNB; send a resource request to the gNB, the resource request comprising the specified amount of low frequency band resources and high frequency band resources for one or more connected devices; receive an allocation from the gNB in response to the resource request, the allocation specifying a set of allocated low frequency band resources and allocated high frequency band resources; evaluate the received allocation to identify one or more compatible resources applicable to the resource request; and transmit a second resource request based on the evaluation, the second resource request including an identification of one or more additional uplink or downlink spectral resources for data transmission.

Clause 18. A non-transitory computer readable medium comprising instructions, the instructions, when executed by a computing system, cause the computing system to: detect a presence of a plurality of data for transmission from a user equipment (UE) to a next generation node B (gNB); determine at the network device a distance to a gNB; based on the determined distance, identify an amount of low frequency band resources and high frequency band resources for an optimized frequency band allocation; send a resource request to the gNB, the resource request including information specifying the identified amount of low frequency band resources and high frequency band resources for one or more connected devices; receive an allocation from the gNB in response to the resource request, the allocation specifying allocated low frequency band resources and allocated high frequency band resources; and modify one or more configurations at the network device to configure the one or more connected devices to utilize the allocated low frequency band resources and the allocated high frequency band resources for data transmission.

Clause 19. The non-transitory computer readable medium of clause 18, wherein the preferred allocation is based on a determined distance from the gNB, the distance from the gNB is determined from a signal to interface plus noise ratio (SINR), where a greater proportion of noise in the SINR corresponds with a greater distance from the gNB.

Clause 20. The non-transitory computer readable medium of clause 18, wherein the request to the gNB that includes the data effective to cause the gNB to respond by allocating the preferred allocation of multiband resources is a scheduling request specifying an amount of low frequency band resources and high frequency band resources for the UE.

Clause 21. The non-transitory computer readable medium of clause 18, wherein the computer readable medium further comprises instructions that, when executed by the computing system, cause the computing system to: process at the gNB the resource request, the processing including: determine based on the resource request one or more spectral resources to allocate to the UE to facilitate transmission of the data; identify by a scheduler of the gNB a first-time period to transmit a first portion of the one or more spectral resources to the UE, and a second time period to transmit the second portion of the one or more spectral resources, wherein the scheduling of the first portion of the one or more spectral resources is based on a priority assigned to one or more data packets by the UE; and transmit to the UE a response to the request comprising an initial uplink grant including the allocation of the one or more spectral resources at the first and second time period.

Clause 22. The non-transitory computer readable medium of clause 20, wherein the computer readable medium further comprises instructions that, when executed by the computing system, cause the computing system to: determine a data rate of the plurality of data for transmission between the UE and the gNB; in response to the data rate not meeting a predetermined threshold: generate a first recommendation to transmit to the gNB, advise an update to the low frequency band and high-frequency band resources allocated for data packet transmission to the UE; and generate a second recommendation to transmit to the UE, direct the allocation of one or more priorities for the transmission of a first set of data packets in the plurality of data.

Clause 23. The non-transitory computer readable medium of clause 18, wherein the computer readable medium further comprises instructions that, when executed by the computing system, cause the computing system to: adjusting, at the gNB, the allocation specifying a set of low frequency band resources and high frequency band resources based on real-time network conditions, wherein the adjustment is determined by the gNB.

Clause 24. The non-transitory computer readable medium of clause 18, wherein the computer readable medium further comprises instructions that, when executed by the computing system, cause the computing system to: monitor one or more parameters associated with the resource request from the UE; monitor one or more parameters associated with the allocation of a set of low frequency band resources and high frequency band resources in response to the resource request; and based on the monitored parameters, generate one or more updates to the allocation of low frequency and high frequency band resources.

Clause 25. The non-transitory computer readable medium of clause 18, wherein the computer readable medium further comprises instructions that, when executed by the computing system, cause the computing system to: establish two independent control loops for uplink transmission and downlink transmission, wherein the UE comprises a controller configured to: determine an optimized frequency band allocation for transmitting a plurality of data based on a distance to the gNB; send a resource request to the gNB, the resource request comprising the specified amount of low frequency band resources and high frequency band resources for one or more connected devices; receive an allocation from the gNB in response to the resource request, the allocation specifying a set of allocated low frequency band resources and allocated high frequency band resources; evaluate the received allocation to identify one or more compatible resources applicable to the resource request; and transmit a second resource request based on the evaluation, the second resource request including an identification of one or more additional uplink or downlink spectral resources for data transmission.

What is claimed is:

1. A method for dual connectivity at a user equipment (UE) in a wireless communication system, the method comprising:

determining at a UE a preferred allocation of multiband resources to be allocated by a gNB;

sending receiving, at a gNB and by from the UE, a request to the gNB that includes data effective to cause the gNB to respond by allocating a preferred allocation of multiband resources, wherein the preferred allocation of multiband resources is the request; and determining based on the request one or more spectral resources to allocate to the UE to facilitate transmission of the data;

identifying by a scheduler of the gNB a first-time period to transmit a first portion of the one or more spectral resources to the UE, and a second time period to transmit a second portion of the one or more spectral resources, wherein the scheduling of the first portion of the one or more spectral resources is based on a priority assigned to one or more data packets by the UE; and transmitting receiving a response to the request comprising an initial uplink grant including a first allocation of the first portion of the multiband resources from the gNB, wherein the gNB provides the first allocation of the multiband resources based on the data effective to cause the gNB to allocate the preferred allocation of multiband resources.

2. The method of claim 1, wherein the preferred allocation is based on a determined distance from the gNB, the distance from the gNB is determined from a signal to interface plus noise ratio (SINR), where a greater proportion of noise in the SINR corresponds with a greater distance from the gNB.

3. The method of claim 1, wherein the request to the gNB that includes the data effective to cause the gNB to respond by allocating the preferred allocation of multiband resources is a scheduling request specifying an amount of low frequency band resources and high frequency band resources for the UE.

4. The method of claim 3, further comprising:

determining a data rate of a plurality of data for transmission between the UE and the gNB;

in response to the data rate not meeting a predetermined threshold:

generating a first recommendation to transmit to the gNB, advising an update to the low frequency band and high-frequency band resources allocated for data packet transmission to the UE; and generating a second recommendation to transmit to the UE, directing the allocation of one or more priorities for the transmission of a first set of data packets in the plurality of data.

5. The method of claim 1, further comprising a deep reinforcement engine configured to:

monitor one or more parameters associated with the resource request from the UE;

monitoring one or more parameters associated with the allocation of a set of low frequency band resources and high frequency band resources in response to the resource request; and based on the monitored parameters, generate one or more updates to the allocation of low frequency and high frequency band resources.

6. The method of claim 3, further comprising establishing two independent control loops for uplink transmission and downlink transmission, wherein the UE comprises a controller configured to:

determine an optimized frequency band allocation for transmitting a plurality of data based on a distance to the gNB;

send a resource request to the gNB, the resource request comprising the specified amount of low frequency band resources and high frequency band resources for one or more connected devices;

receive an allocation from the gNB in response to the resource request, the allocation specifying a set of allocated low frequency band resources and allocated high frequency band resources;

evaluate the received allocation to identify one or more compatible resources applicable to the resource request; and transmit a second resource request based on the evaluation, the second resource request including an identification of one or more additional uplink or downlink spectral resources for data transmission.

7. A user equipment network node comprising:

a transceiver;

a processor configured to execute instructions and cause the processor to:

determine at a UE a preferred allocation of multiband resources to be allocated by a gNB;

send by the UE, receive a request to at the a gNB that includes data effective to cause the gNB to respond by allocating the a preferred allocation of multiband resources, wherein the preferred allocation of multiband resources is the request;

determine based on the request one or more spectral resources to allocate to a user equipment (UE) to facilitate transmission of the data;

identify by a scheduler of the gNB a first-time period to transmit a first portion of the one or more spectral resources to the UE, and a second time period to transmit a second portion of the one or more spectral resources, wherein the scheduling of the first portion of the one or more spectral resources is based on a priority assigned to one or more data packets by the UE; and receive transmit a response to the request comprising an initial uplink grant including a first allocation of the first portion of the multiband resources from the gNB, wherein the gNB provides the first allocation of the multiband resources based on the data effective to cause the gNB to allocate the preferred allocation of multiband resources.

8. The UE network node of claim 7, wherein the preferred allocation is based on a determined distance from the gNB, the distance from the gNB is determined from a signal to interface plus noise ratio (SINR), where a greater proportion of noise in the SINR corresponds with a greater distance from the gNB.

9. The UE network node of claim 7, wherein the request to the gNB that includes the data effective to cause the gNB to respond by allocating the preferred allocation of multiband resources is a scheduling request specifying an amount of low frequency band resources and high frequency band resources for the UE.

10. The UE network node of claim 7, wherein the instructions further cause the processor to:

monitor one or more parameters associated with the resource request from the UE;

monitor one or more parameters associated with the allocation of a set of low frequency band resources and high frequency band resources in response to the resource request; and based on the monitored parameters, generate one or more updates to the allocation of low frequency and high frequency band resources.

11. The UE network node of claim 9, wherein the instructions further cause the processor to:

establish two independent control loops for uplink transmission and downlink transmission, wherein the UE comprises a controller configured to:

determine an optimized frequency band allocation for transmitting a plurality of data based on a distance to the gNB;

send a resource request to the gNB, the resource request comprising the specified amount of low frequency band resources and high frequency band resources for one or more connected devices;

receive an allocation from the gNB in response to the resource request, the allocation specifying a set of allocated low frequency band resources and allocated high frequency band resources;

evaluate the received allocation to identify one or more compatible resources applicable to the resource request; and transmit a second resource request based on the evaluation, the second resource request including an identification of one or more additional uplink or downlink spectral resources for data transmission.

12. A non-transitory computer readable medium comprising instructions, the instructions, when executed by at least one processor a computing system, causes a the computing system to:

detect a presence of a plurality of data for transmission from a user equipment (UE) to a next generation node B (gNB);

determine at a network device a distance to a gNB;

based on the determined distance, identify an amount of low frequency band resources and high frequency band resources for an optimized frequency band allocation;

send a resource request to the gNB, the resource request including information specifying the identified amount of low frequency band resources and high frequency band resources for one or more connected devices, wherein in response to the gNB receiving the resource request, the gNB processes the resource request by:

determining based on the resource request one or more spectral resources to allocate to the UE to facilitate transmission of the data;

identifying by a scheduler of the gNB a first-time period to transmit a first portion of the one or more spectral resources to the UE, and a second time period to transmit the second portion of the one or more spectral resources, wherein the scheduling of the first portion of the one or more spectral resources is based on a priority assigned to one or more data packets by the UE; and transmitting to the UE a response to the resource request comprising an initial uplink grant including an allocation of the one or more spectral resources at the first and second time period;

receive an the allocation from the gNB in response to the resource request, the allocation specifying allocated low frequency band resources and allocated high frequency band resources; and modify one or more configurations at the network device to configure the one or more connected devices to utilize the allocated low frequency band resources and the allocated high frequency band resources for data transmission.

13. The non-transitory computer readable medium of claim 12, wherein the allocation is based on a determined distance from the gNB, the distance from the gNB is determined from a signal to interface plus noise ratio (SINR), where a greater proportion of noise in the SINR corresponds with a greater distance from the gNB.

14. The non-transitory computer readable medium of claim 12, wherein the request to the gNB that includes the data effective to cause the gNB to respond by allocating the allocation of multiband resources is a scheduling request specifying an amount of low frequency band resources and high frequency band resources for the UE.

15. The non-transitory computer readable medium of claim 14, wherein the computer readable medium further comprises instructions that, when executed by the computing system, cause the computing system to:

determine a data rate of the plurality of data for transmission between the UE and the gNB;

in response to the data rate not meeting a predetermined threshold:

generate a first recommendation to transmit to the gNB, advise an update to the low frequency band and high-frequency band resources allocated for data packet transmission to the UE; and generate a second recommendation to transmit to the UE, direct the allocation of one or more priorities for the transmission of a first set of data packets in the plurality of data.

16. The non-transitory computer readable medium of claim 12, wherein the computer readable medium further comprises instructions that, when executed by the computing system, cause the computing system to:

adjusting, at the gNB, the allocation specifying a set of low frequency band resources and high frequency band resources based on real-time network conditions, wherein the adjustment is determined by the gNB.

17. The non-transitory computer readable medium of claim 12, wherein the computer readable medium further comprises instructions that, when executed by the computing system, cause the computing system to:

monitor one or more parameters associated with the resource request from the UE;

monitor one or more parameters associated with the allocation of a set of low frequency band resources and high frequency band resources in response to the resource request; and based on the monitored parameters, generate one or more updates to the allocation of low frequency and high frequency band resources.

18. The non-transitory computer readable medium of claim 12, wherein the computer readable medium further comprises instructions that, when executed by the computing system, cause the computing system to:

establish two independent control loops for uplink transmission and downlink transmission, wherein the UE comprises a controller configured to:

determine an optimized frequency band allocation for transmitting a plurality of data based on a distance to the gNB;

send a resource request to the gNB, the resource request comprising the specified amount of low frequency band resources and high frequency band resources for one or more connected devices;

receive an allocation from the gNB in response to the resource request, the allocation specifying a set of allocated low frequency band resources and allocated high frequency band resources;

evaluate the received allocation to identify one or more compatible resources applicable to the resource request; and transmit a second resource request based on the evaluation, the second resource request including an identification of one or more additional uplink or downlink spectral resources for data transmission.

19. The network node of claim 7, wherein the instructions further cause the processor to:

determine a data rate of a plurality of data for transmission between the UE and the gNB;

in response to the data rate not meeting a predetermined threshold:

generate a first recommendation to transmit to the gNB, advising an update to a low frequency band and high-frequency band resources allocated for data packet transmission to the UE; and generate a second recommendation to transmit to the UE, directing the allocation of one or more priorities for the transmission of a first set of data packets in the plurality of data.

20. The method of claim 1, further comprising:

adjusting, at the gNB, the allocation specifying a set of low frequency band resources and high frequency band resources based on real-time network conditions, wherein the adjustment is determined by the gNB.

* * * * *